US012527837B2

(12) United States Patent
Mira Obrador et al.

(10) Patent No.: US 12,527,837 B2
(45) Date of Patent: Jan. 20, 2026

(54) PEPTIDE FOR USE IN THE PREVENTION AND/OR TREATMENT OF A DISEASE CAUSED BY A VIRUS AFFECTING THE RESPIRATORY TRACT

(71) Applicant: FUNDACIÓN PARA EL FOMENTO DE LA INVESTIGACIÓN SANITARIA Y BIOMÉDICA DE LA COMUNITAT VALENCIANA (FISABIO), Valencia (ES)

(72) Inventors: Alejandro Mira Obrador, Valencia (ES); Maria de los Desamparados Ferrer García, Valencia (ES); Paula Corell Escuin, Valencia (ES); Francisco Javier López Labrador, Valencia (ES)

(73) Assignee: FUNDACION PARA EL FOMENTO DE LA INVESTIGACIÓN SANITARIA Y BIOMÉDICA DE LA COMUNITAT VALENCIANA (FISABIO), Valencia (ES)

( * ) Notice: Subject to any disclaimer, the term of this patent is extended or adjusted under 35 U.S.C. 154(b) by 604 days.

(21) Appl. No.: 17/998,366

(22) PCT Filed: May 19, 2021

(86) PCT No.: PCT/EP2021/063389
§ 371 (c)(1),
(2) Date: Nov. 10, 2022

(87) PCT Pub. No.: WO2021/234057
PCT Pub. Date: Nov. 25, 2021

(65) Prior Publication Data

US 2023/0173022 A1 Jun. 8, 2023

(30) Foreign Application Priority Data

May 20, 2020 (ES) ................................ ES202030468

(51) Int. Cl.
*A61K 38/17* (2006.01)
*A61P 11/00* (2006.01)
*A61P 31/16* (2006.01)

(52) U.S. Cl.
CPC .......... *A61K 38/1709* (2013.01); *A61P 11/00* (2018.01); *A61P 31/16* (2018.01)

(58) Field of Classification Search
None
See application file for complete search history.

(56) References Cited

FOREIGN PATENT DOCUMENTS

| | | | | | |
|---|---|---|---|---|---|
| DE | 10129983 | | | 1/2003 | |
| EP | 0920449 | B1 | * | 10/2002 | ........... C07K 14/005 |
| WO | WO-2005040201 | A1 | * | 5/2005 | ......... A61K 38/1709 |
| WO | WO 2007/133730 | | | 11/2007 | |
| WO | WO-2013039857 | A1 | * | 3/2013 | ......... A61K 48/0066 |
| WO | WO-2017004591 | A2 | * | 1/2017 | .............. A61P 31/04 |

OTHER PUBLICATIONS

CIDRAP News, Nov. 18, 2003, downloaded from URL :<http://www.cidrap.umn.edu/news-perspective/2003/11/nih-launches-first-human-trial-ebola-vaccine> (Year: 2003).*
Mullin (Fierce Biotech, 2014), downloaded from URL :<http://www.fiercebiotech.com/r-d/ebola-outbreak-rages-on-as-drug-development-remains-slow> (Year: 2014).*
Hu et al. (International Journal of Infectious Diseases 76 (2018) 70-72) (Year: 2018).*
Xia et al. (Cell Research (2020) 30:343-355) (Year: 2020).*
European Office Action for EP21728839.8 mailed Mar. 20, 2024, 7 pages.
Schittek et al., Dermicidin: A novel human antibiotic peptide secreted by sweat glands, Nature Immulogy, Dec. 1, 2001, vol. 2, No. 12, pp. 1133-1137.
International Search Report and Written Opinion for PCT/EP2021/063389. Mailed Nov. 9, 2021. 14 pages.
Jones et al., Inhibition of influenza virus infection by a novel antiviral peptide that targets viral attachment to cells. J Virol. Dec. 2006;80(24):11960-7.

* cited by examiner

*Primary Examiner* — Sergio Coffa
(74) *Attorney, Agent, or Firm* — Casimir Jones, S.C.; Tristan A. Fuierer

(57) ABSTRACT

Peptides and pharmaceutical compositions comprising the same are described for use in the treatment and/or prevention of a disease caused by a virus affecting the respiratory tract, and in particular by an influenza virus or a coronavirus, among others. Additionally, a method and a kit for determining in vitro the resistance of an individual to being infected by a virus affecting the respiratory tract by determining the level of said peptides in the saliva of said individual is described.

11 Claims, 6 Drawing Sheets

Specification includes a Sequence Listing.

A

B

PEPTIDE FOR USE IN THE PREVENTION AND/OR TREATMENT OF A DISEASE CAUSED BY A VIRUS AFFECTING THE RESPIRATORY TRACT

CROSS-REFERENCE TO RELATED APPLICATIONS

This application is filed under the provisions of 35 U.S.C. § 371 and claims the priority of International Patent Application No. PCT/EP2021/063389, filed on 19 May 2021 entitled "PEPTIDE FOR USE IN THE PREVENTION AND/OR TREATMENT OF A DISEASE CAUSED BY A VIRUS AFFECTING THE RESPIRATORY TRACT" in the name of Alejandro MIRA OBRADOR, et al., which claims priority to Spanish Patent Application No. P202030468 filed on 20 May 2020, both of which are hereby incorporated by reference herein in their entirety.

TECHNICAL FIELD OF THE INVENTION

The present invention relates to a peptide for use in the prevention and/or treatment of a disease caused by a virus affecting the respiratory tract, and in particular by a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus or an enterovirus. Additionally, the present invention also relates to an in vitro method for detecting peptides with antiviral activity, and in particular peptides active against a virus affecting the respiratory tract, such as the influenza virus, in saliva samples. Finally, the present invention also relates to an in vitro method for determining the level of resistance of an individual to develop symptoms of a viral disease of the respiratory tract and, more in particular, symptoms of a disease caused by a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus or an enterovirus and, consequently, to suffer from said viral disease.

BACKGROUND OF THE INVENTION

Viruses, and in particular influenza viruses, are a major cause of respiratory diseases, causing annual epidemics and even pandemics with a severe impact on public health, accounting for hundreds of thousands to millions of deaths worldwide. Of all the different types and subtypes of influenza viruses, A(H1N1), A(H3N2) and B are the most common ones infecting humans, the first two being associated with increased morbidity.

Due to the burden of disease associated with viruses, and in particular the influenza virus, several approaches have been developed to fight against this infectious agent. In developed countries, annual influenza vaccination campaigns have been established for persons at greater risk. But a vaccine developed one year may not be effective the following year due to the frequent and rapid mutations (changes in its antigens) of the virus and the varying dominance of the various strains of the influenza virus itself. On the other hand, treatment is only symptomatic and, in cases requiring hospital admission, is usually related to maintaining patient's vital functions, while antiviral drugs are reserved for the most severe cases (the most effective are neuraminidase inhibitors), although they are not without toxicity. Although studies have shown that some antivirals, notably oseltamivir, can reduce the duration of the replication phase of influenza viruses and improve survival prospects, no highly effective treatment has yet been found for these diseases.

It is therefore necessary to find treatments against viral diseases in general and, in particular, against influenza and other viruses affecting the respiratory tract. In addition, there is a need to establish effective methods for the detection of potential new treatments.

BRIEF DESCRIPTION OF THE INVENTION

The present invention describes a peptide comprising a sequence SEQ ID No.: 1, or a derivative thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus.

Additionally, the present invention relates to a method for determining in vitro the level of resistance of an individual to develop symptoms of a viral respiratory tract disease or infection and, more in particular, symptoms of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus, wherein said method comprises determining the concentration of a peptide comprising a sequence SEQ ID No.: 17, or a fragment thereof, in a saliva sample; such that the higher the concentration of such peptides in the sample is, the greater the resistance of the individual is against a viral disease of the respiratory tract, and more in particular against a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus and thus, to suffering from said viral disease.

The present invention further relates to a kit for determining in vitro the level of resistance of an individual to develop symptoms of a viral disease or infection of the respiratory tract and, more particularly, symptoms caused by a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus, wherein said kit comprises means for determining the concentration of a peptide comprising the sequence SEQ ID No.: 17 or a fragment thereof, in a saliva sample. Finally, the present invention concerns a method for detecting in vitro peptides with activity against infectious microorganisms, in particular with antiviral activity in saliva samples.

DESCRIPTION OF THE INVENTION

Figure 1:
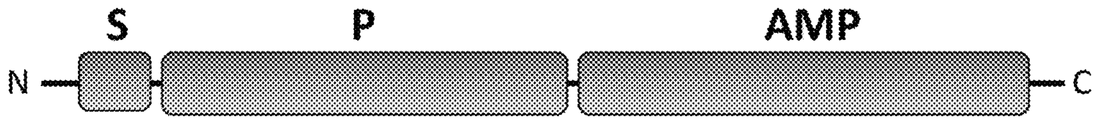
FIG. 1. Schematic representation of the post-transcriptional organization of the gene which encodes the dermcidin, indicating its signal domains(S) with 19 aminoacids, its prodomain (P) with 43 aminoacids, and its AMP domain (AMP) with 48 aminoacids.

The present invention therefore relates to a peptide, characterised in that it comprises a sequence SEQ ID No.: 1 or a derivative thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus, wherein the peptide with SEQ ID No.: 1 is a fragment derived from the human protein dermcidin. Dermcidin is a protein of human origin which, once secreted, is processed (i.e. suffers an enzymatic fragmentation) to give rise to different fragments or smaller peptides of different biological activity. The sequence of dermcidin, shown in FIG. 1, consists of 110 aminoacids of which, starting at the N-terminus end, the first 19 aminoacids correspond to the signal peptide, the next 43 aminoacids make up the prodomain and the next 48 aminoacids are called the antimicrobial domain, or AMP. The name AMP refers to the fact that the prior art has described antimicrobial effects derived from peptides with this sequence (patent publication number DE10129983 A1).

For the purposes of the present invention, the sequence of dermcidin (isoform 1, NCBI Reference Sequence: NP_444513.1) is SEQ ID No.: 17. Accordingly, the term "dermcidin", refers, for the purposes of present invention, to a peptide of sequence SEQ ID No.: 17.

On the other hand, for the purposes of the present invention, any of the peptides having (consisting of) the aminoacidic sequences of the peptide fragments which are result of the enzymatic processing of dermcidin occurring in the human organism, are referred to as "dermcidin peptides" or "dermcidin fragments". Said dermcidin fragments may be of natural origin (i.e. being result of said natural enzymatic processing of dermcidin in the human organism), or may be obtained by synthesis, for instance, as disclosed herein, in example 2 of present invention. The aminoacid sequences of the protein dermcidin and these "dermcidin fragments" are listed in Table 1:

TABLE 1

Table 1. Dermcidin and fragments thereof

| | | |
|---|---|---|
| LEK-42 | SEQ ID No.: 1 | LEKGLDGAKK AVGGLGKLGK DAVEDLESVG KGAVHDVKDV LD |
| LEK-45 | SEQ ID No.: 2 | LEKGLDGAKK AVGGLGKLGK DAVEDLESVG KGAVHDVKDV LDSVL |
| SSL-45 | SEQ ID No.: 3 | SSLLEKGLDG AKKAVGGLGK LGKDAVEDLE SVGKGAVHDV KDVLD |
| DCD | SEQ ID No.: 4 | SSLLEKGLDG AKKAVGGLGK LGKDAVEDLE SVGKGAVHDV KDVLDSV |
| DCD-1L | SEQ ID No.: 5 | SSLLEKGLDG AKKAVGGLGK LGKDAVEDLE SVGKGAVHDV KDVLDSVL |
| SSL-46 | SEQ ID No.: 6 | SSLLEKGLDG AKKAVGGLGK LGKDAVEDLE SVGKGAVHDV KDVLDS |
| LEK-44 | SEQ ID No.: 7 | LEKGLDGAKK AVGGLGKLGK DAVEDLESVG KGAVHDVKDV LDSV |
| LEK-43 | SEQ ID No.: 8 | LEKGLDGAKK AVGGLGKLGK DAVEDLESVG KGAVHDVKDV LDS |
| SSL-29 | SEQ ID No.: 9 | SSLLEKGLDG AKKAVGGLGK LGKDAVEDL |
| SSL-25 | SEQ ID No.: 10 | SSLLEKGLDG AKKAVGGLGK LGKDA |
| LEK-41 | SEQ ID No.: 11 | LEKGLDGAKK AVGGLGKLGK DAVEDLESVG KGAVHDVKDV L |
| LEK-26 | SEQ ID No.: 12 | LEKGLDGAKK AVGGLGKLGK DAVEDL |
| LEK-24 | SEQ ID No.: 13 | LEKGLDGAKK AVGGLGKLGK DAVE |
| YDP-42 | SEQ ID No.: 14 | YDPEAASAPG SGNPCHEASA AQKENAGEDP GLARQAPKPR KQ |

TABLE 1-continued

| Table 1. Dermcidin and fragments thereof | | |
|---|---|---|
| Y-P30 | SEQ ID No.: 15 | YDPEAASAPG SGNPCHEASA AQKENAGEDP |
| PIF | SEQ ID No.: 16 | YDPEAASAPG SGNPCHEAS A |
| Dermcidin (NCBI Ref. Seq: NP_444513 *1 | SEQ ID No.: 17 | MRFMTLLFLT ALAGALVCAY DPEAASAPGS GNPCHEASAA QKENAGEDPG LARQAPKPRK QRSSLLEKGL DGAKKAVGGL GKLGKDAVED LESVGKGAVH DVKDVLDSVL |

Accordingly, for the purposes of the present invention the term "dermcidin" refers to a peptide of sequence SEQ ID No.: 17, i.e., a peptide consisting of sequence SEQ ID No.: 17.

On the other hand, the term "dermcidin fragment" refers to a peptide consisting of, or comprising, any of the aminoacidic sequences SEQ ID Nos.: 1, 2, 3, 4, 5, 6, 7, 8, 9, 10, 11, 12, 13, 14, 15 and 16 disclosed in table 1.

Thus, the term "a peptide of sequence SEQ ID Nos.: 17 or any of the fragments thereof" or the term "a peptide of any of sequences SEQ ID Nos.: 1 to 17", refer to any peptide consisting of one of the aminoacidic sequences SEQ ID Nos.: 1 to 17, as disclosed in table 1 herein.

Finally, the term "dermcidin derivative" refers to a peptide having a sequence in which at least one aminoacid is different from the aminoacid present in the natural occurring sequence, because said aminoacid has been artificially modified or replaced; or additionally, to a peptide having at least 80%, preferably at least 90%, and more preferably at least 95% sequence identity, with any of the aminoacidic sequences SEQ ID Nos.: 1, 2, 3, 4, 5, 6, 7, 8, 9, 10, 11, 12, 13, 14, 15, 16 and 17 disclosed in table 1 herein. In a preferred embodiment of the invention the dermcidin derivative is a peptide comprising or consisting of a sequence selected from the group consisting of SEQ ID Nos.: 1, 2, 3, 4, 5, 6, 7, 8, 9, 10, 11, 12, 13, 14, 15, 16 and 17, in which at least one aminoacid is modified. Said modification may be artificial or naturally occurring. In a more preferred embodiment of the invention the dermcidin derivative is a peptide comprising or consisting of a sequence selected from the group consisting of SEQ ID Nos.: 1, 2, 3, 4, 5, 6, 7, 8, 9, 10, 11, 12, 13, 14, 15, 16 and 17, in which at least one aminoacid is acetylated, methylated, formylated, amidated or phosphorylated. In an even more preferred embodiment, said peptide is a derivative in which at least one aminoacid is acetylated.

Thus, in a preferred embodiment of the invention the dermcidin derivative is a peptide comprising or consisting of any of sequences SEQ ID Nos.: 1, 2, 7, 8, 11, 12 and 13, in which the lysine in position 3 is acetylated, wherein said dermcidin derivatives comprise or consist, respectively, of a sequence SEQ ID Nos.: 19, 20, 25, 26, 29, 30 and 31. In another more preferred embodiment of the invention the dermcidin derivative is a peptide comprising or consisting of a sequence selected from the group consisting of SEQ ID Nos.: 3, 4, 5, 6, 9 and 10, in which the lysine in position 6 is acetylated, wherein said dermcidin derivatives comprise or consist, respectively, of a sequence SEQ ID Nos.: 21, 22, 23, 24, 27 and 28. In another more preferred embodiment the dermcidin derivative is a peptide comprising or consisting of a sequence SEQ ID No: 17, in which the lysine in position 68 is acetylated wherein said dermcidin derivative comprises or consists of SEQ ID No. 32. Said derivative dermcidin peptides of SEQ ID Nos.: 19 to 32 are included in the following table 1.2:

TABLE 1.2

| Table 1.2: Acetylated derivative dermcidin peptides. Acetylated aminoacid is marked with an asterisk * (i.e. acetylated lysine is K*). | | |
|---|---|---|
| SEQ ID No. 19 | Derivative of SEQ ID No.: 1 with acetylated lysine in position 3 | LEK*GLDGAKK AVGGLGKLGK DAVEDLESVG KGAVHDVKDV LD |
| SEQ ID No.: 20 | Derivative of SEQ ID No.: 2 with acetylated lysine in position 3 | LEK*GLDGAKK AVGGLGKLGK DAVEDLESVG KGAVHDVKDV LDSVL |
| SEQ ID No.: 21 | Derivative of SEQ ID No.: 3 with acetylated lysine in position 6 | SSLLEK*GLDG AKKAVGGLGK LGKDAVEDLE SVGKGAVHDV KDVLD |
| SEQ ID No.: 22 | Derivative of SEQ ID No.: 4 with acetylated lysine in position 6 | SSLLEK*GLDG AKKAVGGLGK LGKDAVEDLE SVGKGAVHDV KDVLDSV |
| SEQ ID No.: 23 | Derivative of SEQ ID No.: 5 with acetylated lysine in position 6 | SSLLEK*GLDG AKKAVGGLGK LGKDAVEDLE SVGKGAVHDV KDVLDSVL |
| SEQ ID No.: 24 | Derivative of SEQ ID No.: 6 with acetylated lysine in position 6 | SSLLEK*GLDG AKKAVGGLGK LGKDAVEDLE SVGKGAVHDV KDVLDS |
| SEQ ID No.: 25 | Derivative of SEQ ID No.: 7 with acetylated lysine in position 3 | LEK*GLDGAKK AVGGLGKLGK DAVEDLESVG KGAVHDVKDV LDSV |
| SEQ ID No.: 26 | Derivative of SEQ ID No.: 8 with acetylated lysine in position 3 | LEK*GLDGAKK AVGGLGKLGK DAVEDLESVG KGAVHDVKDV LDS |

TABLE 1.2-continued

Table 1.2: Acetylated derivative dermcidin peptides. Acetylated aminoacid is marked with an asterisk * (i.e. acetylated lysine is K*).

| | | |
|---|---|---|
| SEQ ID No.: 27 | Derivative of SEQ ID No.: 9 with acetylated lysine in position 6 | SSLLEK*GLDG AKKAVGGLGK LGKDAVEDL |
| SEQ ID No.: 28 | Derivative of SEQ ID No.: 10 with acetylated lysine in position 6 | SSLLEK*GLDG AKKAVGGLGK LGKDA |
| SEQ ID No.: 29 | Derivative of SEQ ID No.: 11 with acetylated lysine in position 3 | LEK*GLDGAKK AVGGLGKLGK DAVEDLESVG KGAVHDVKDV L |
| SEQ ID No.: 30 | Derivative of SEQ ID No.: 12 with acetylated lysine in position 3 | LEK*GLDGAKK AVGGLGKLGK DAVEDL |
| SEQ ID No.: 31 | Derivative of SEQ ID No.: 13 with acetylated lysine in position 3 | LEK*GLDGAKK AVGGLGKLGK DAVE |
| SEQ ID No.: 32 | Derivative of SEQ ID No.: 17 with acetylated lysine in position 68 | MRFMTLLFLT ALAGALVCAY DPEAASAPGS GNPCHEASAA QKENAGEDPG LARQAPKPRK QRSSLLEK*GL DGAKKAVGGL GKLGKDAVED LESVGKGAVH DVKDVLDSVL |

The different abbreviations and sequences ID numbers of the peptides dermcidin and fragments thereof are defined, for the purposes of the present invention in the above referred table 1. Accordingly, even though in some documents of the state of the art, the peptide dermcidin (herein disclosed as SEQ ID No: 17) is commonly abbreviated as DCD, for the purposes of the present disclosure, the abbreviation DCD is only used in the present disclosure for the peptide of sequence SEQ ID No.: 4. In the same manner, even though in some documents of the state of the art the peptide of SEQ ID No: 4 is designated with the abbreviation DCD-1, for the purposes of the present invention the dermcidin fragment of sequence SEQ ID No.: 4 is abbreviated in the present disclosure as DCD, whereas the dermcidin fragment of sequence SEQ ID No: 5 is abbreviated in the present disclosure as DCD-1L.

The present invention relates to a peptide comprising a sequence SEQ ID No.: 1, or a derivative thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. Furthermore, the present invention also relates to a peptide comprising a sequence selected from the group consisting of SEQ ID Nos.: 1, 2, 3, 4, 5, 6, 7, 8 and 17, or a derivative thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus, given that sequences SEQ ID Nos.: 2, 3, 4, 5, 6, 7, 8 and 17 comprise the dermcidin fragment with sequence SEQ ID No.: 1. Preferably, the invention relates to a peptide comprising a sequence selected from the group consisting of SEQ ID No.: 4 and SEQ ID No.: 5, or a derivative thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus.

Additionally, one embodiment of present invention relates to a peptide comprising a sequence selected from the group consisting of SEQ ID Nos.: 1, 2, 3, 4, 5, 6, 7, 8, 9, 10, 11, 12, 13, 14, 15, 16 and 17, or a derivative thereof, or a pharmaceutical composition comprising at least one of said peptides or a combination thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. Moreover, another embodiment relates to a peptide comprising a sequence selected from the group consisting of SEQ ID Nos.: 9, 10, 11, 12, 13, 14, 15 and 16, or a derivative thereof, or a pharmaceutical composition comprising at least one of said peptides or a combination thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. A further embodiment relates to a peptide consisting of a sequence selected from the group consisting of SEQ ID Nos.: 1, 2, 3, 4, 5, 6, 7, 8, 9, 10, 11, 12, 13, 14, 15, 16 and 17, or a derivative thereof, or a pharmaceutical composition comprising at least one of said peptides or a combination thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. An additional further embodiment relates to a peptide consisting of a sequence selected from the group consisting of SEQ ID Nos.: 9, 10, 11, 12, 13, 14, 15 and 16, or a derivative thereof, or a pharmaceutical composition comprising at least one of said peptides or a combination thereof, for use in the prevention and/or treatment of a disease caused by a virus affecting the respiratory tract, and in particular in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus.

Dermcidin was thought to be present only in tissues such as sweat, placenta, blood or human milk. In the present invention, dermcidin is detected for the first time in human saliva, as described in example 1.

Thus, one aspect of the invention relates to an in vitro method for detecting a peptide with activity against an infectious microorganism, in particular with activity against a viral pathology, wherein said method comprises:

- extracting and quantifying in vitro DNA from at least one sample from a donor resistant to that infectious microorganism;
- obtaining at least one library from said extracted DNA;
- expressing the cloned genes from each library;
- processing the produced proteins and peptides according to the screening method to be used;
- screening the produced proteins and peptides to determine which ones have activity against the infectious microorganism.

In general, the screening will be carried out selecting the produced proteins according to the type of microorganism or type of pathology. Said microorganism is selected from a virus, a bacterium or a fungus. Preferably said microorganism is a virus.

More preferably, the virus is selected, without limitation, from the group consisting of: an influenza virus; a coronavirus; a syncytial virus (RSV); a rhinovirus (RVs); a parainfluenza virus (PIV); an adenovirus (ADV); a morbillivirus, such as a measles virus, and an enterovirus. Preferably, the coronavirus is selected from the group consisting of a coronavirus HcoV-OC43, SARS, MERS or SARS-COV-2. Also preferably, the enterovirus is ENV-D68. Accordingly, most preferably the virus is selected from the group consisting of an influenza virus (flu virus), a coronavirus HcoV-OC43 (common cold virus), SARS, MERS or SARS-COV-2, a syncytial virus (RSV); a rhinovirus (RVs); a parainfluenza virus (PIV); an adenovirus (ADV); a morbillivirus and an enterovirus ENV-D68.

In one embodiment of the present invention, such screening comprises identifying one or more proteins, or one or more peptides, that interact with, or block, a virus protein that initiates cell recognition or cell adhesion and thereby initiates infection.

In a preferred embodiment such screening comprises using an in vitro immunoassay (ELISA) technique, wherein the binding or interaction between the viral protein and one or more expressed proteins or peptide(s) is detected.

Alternatively, in another preferred embodiment, such screening comprises using an in vitro assay that detects whether virus attachment to a cell, in the presence of any of the expressed proteins and peptides, occurs.

In one embodiment of the method of the invention the sample is an oral mucosa sample.

Preferably, said microorganism is a virus and more preferably is an influenza virus. Influenza viruses bind via surface proteins, haemagglutinins, to sialic acid sugars on the membrane of mucosal epithelial cells of the nasal passages, throat and lungs, being the first step of infection resulting in endocytosis of the virus into the cell.

In one embodiment of the method of the invention, screening of the produced proteins or peptides is performed by assessing the activity of each produced protein or peptide using a haemagglutination inhibition test.

The Haemagglutination Inhibition (HAI) technique is based on the ability of viruses to agglutinate red blood cells due to the viral protein haemagglutinin (HA). In particular, viruses agglutinate red blood cells due to the interaction of a receptor in the red blood cell membrane with a specific protein of the virus (e.g. the haemagglutinin (HA) protein in the case of influenza virus or the measles virus among others, or both haemagglutinin and spike proteins in the case of a coronavirus). Since HA is involved in the first step of the infection cycle of influenza viruses, this technique has made it possible to identify peptides, for use in accordance with the present invention, that interfere with the influenza virus at the beginning of the infection cycle.

Figure 2:
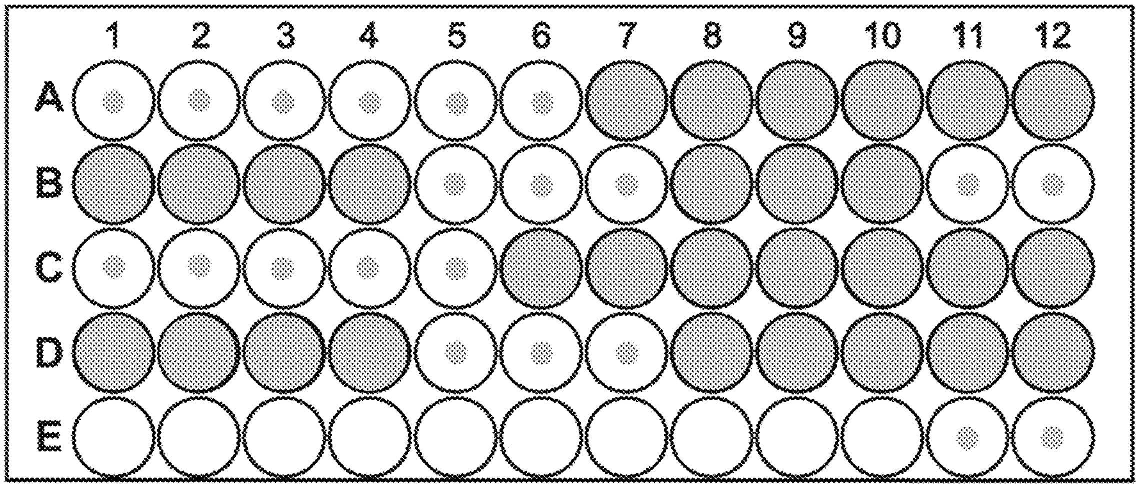
FIG. 2. Schematic representation of the results of a Haemagglutination Inhibition Assay (HAI) with standardised antigens of influenza virus. All wells contain 5% v/v turkey red blood cells (RBC), which is equivalent to $4\times10^8$ cells/ml in phosphate buffered saline (PBS). Serial dilutions of peptide with sequence SEQ ID No.: 5 in the presence of standardised antigens from H1N1 virus at 8 HAU-Haemagglutination Units –/50 µl (row A) and standardised antigens from H3N2 virus at 4 HAU/25 µl (row C). Serial dilutions of the EB peptide (SEQ ID No.: 18) as a positive control in the presence of standardised antigens from H1N1 virus at 8 HAU/50 µl (row B) and standardised antigens from H3N2 virus at 4 HAU/25 µl (row D). Columns 1 to 10 each include respectively: 4 mg/ml (column 1), 2 mg/ml (column 2), 1 mg/ml (column 3), 0.5 mg/ml (column 4), 0.25 mg/ml (column 5), 0.125 mg/ml (column 6), 0.06 mg/ml (column 7), 0.03 mg/ml (column 8), 0.015 mg/ml (column 9), and 8 µg/ml (column 10), of the corresponding stock solution of the peptide. Columns 11 and 12 included the following controls: A11 and A12 contain RBC in the presence of standardised antigens from H1N1 virus at 8 HAU/50 µl; B11 and B12 contain 4 mg/ml of the stock solution of the peptide of SEQ ID No.: 5 and RBC; C11 and C12 contain standardised antigens from H3N2 virus at 4 HAU/25 µl and RBC; D11 and D12 contain 4 mg/ml of the stock solution of the EB peptide and RBC; and E11 and E12 contain only PBS in the presence of RBC.
Figure 3:
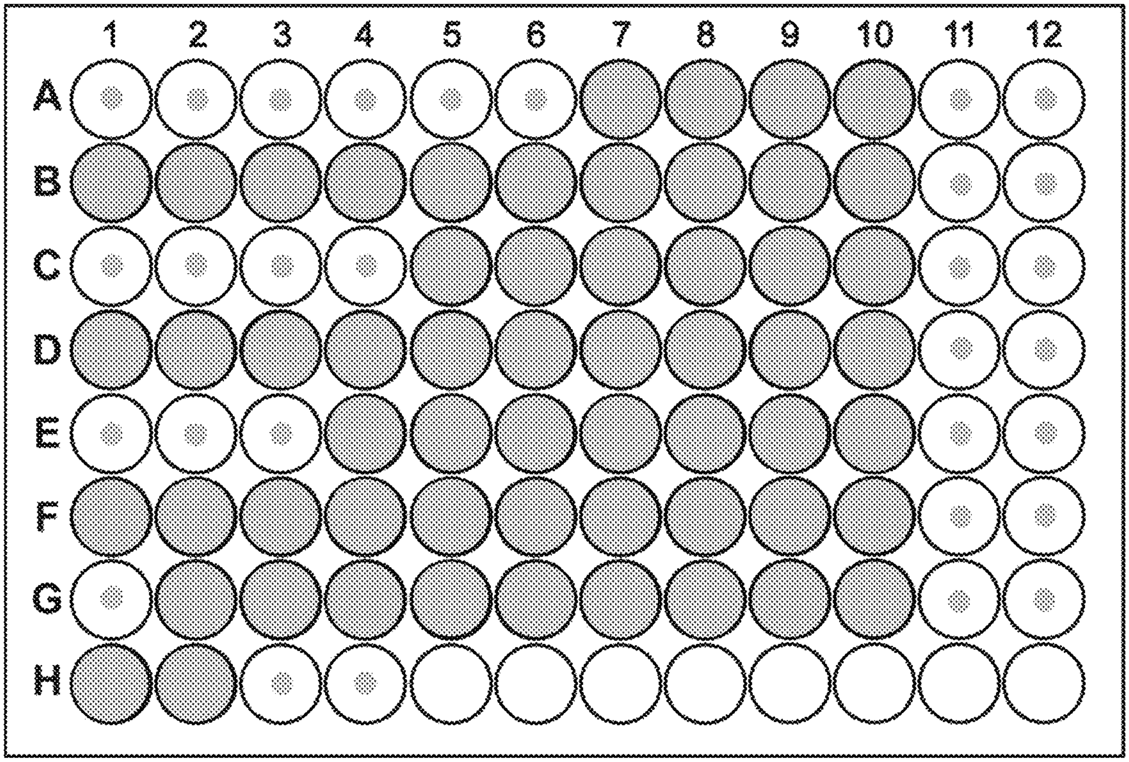
FIG. 3. Schematic representation of a HAI with standardised antigens of influenza virus. All wells contain 5% v/v turkey red blood cells (RBC), which is equivalent to $4\times10^8$ cells/ml in phosphate buffered saline (PBS). Each row corresponds to a different peptide: peptide with sequence SEQ ID No.: 5 (row A), peptide with sequence SEQ ID No.: 14 (row B), peptide with sequence SEQ ID No.: 3 (row C), peptide with sequence SEQ ID No.: 10 (row D), peptide with sequence SEQ ID No.: 2 (row E), peptide with sequence SEQ ID No.: 13 (row F) and peptide with sequence SEQ ID No.: 1 (row G) all of which were tested against standardised antigens from H1N1 virus at 8 HAU/50 µl. Columns 1 to 10 each include respectively: 4 mg/ml (column 1), 2 mg/ml (column 2), 1 mg/ml (column 3), 0.5 mg/ml (column 4), 0.25 mg/ml (column 5), 0.125 mg/ml (column 6), 0.06 mg/ml (column 7), 0.03 mg/ml (column 8), 0.015 mg/ml (column 9) and 8 ng/ml (column 10), of the corresponding stock solution of the peptide; except row G, where the dilutions of the peptide used were: 8 mg/ml (column 1), 4 mg/ml (column 2), 2 mg/ml (column 3), 1 mg/ml (column 4), 0.5 mg/ml (column 5), 0.25 mg/ml (column 6), 0,125 mg/ml (column 7), 0.06 mg/ml (column 8), 0.03 mg/ml (column 9) and 0.015 mg/ml (column 10) of the stock solution of the peptide. Columns 11 and 12 included the controls corresponding to the peptide in each row at a stock solution concentration of 4 mg/ml and RBC; except for row G where the control contains the peptide at a stock solution concentration of 8 mg/ml and RBC. H1 and H2 contain a control containing standardised antigens from H1N1 virus at 8 HAU/50 µl and RBC, while H3 and H4 contain only PBS and RBC.
Figure 4:
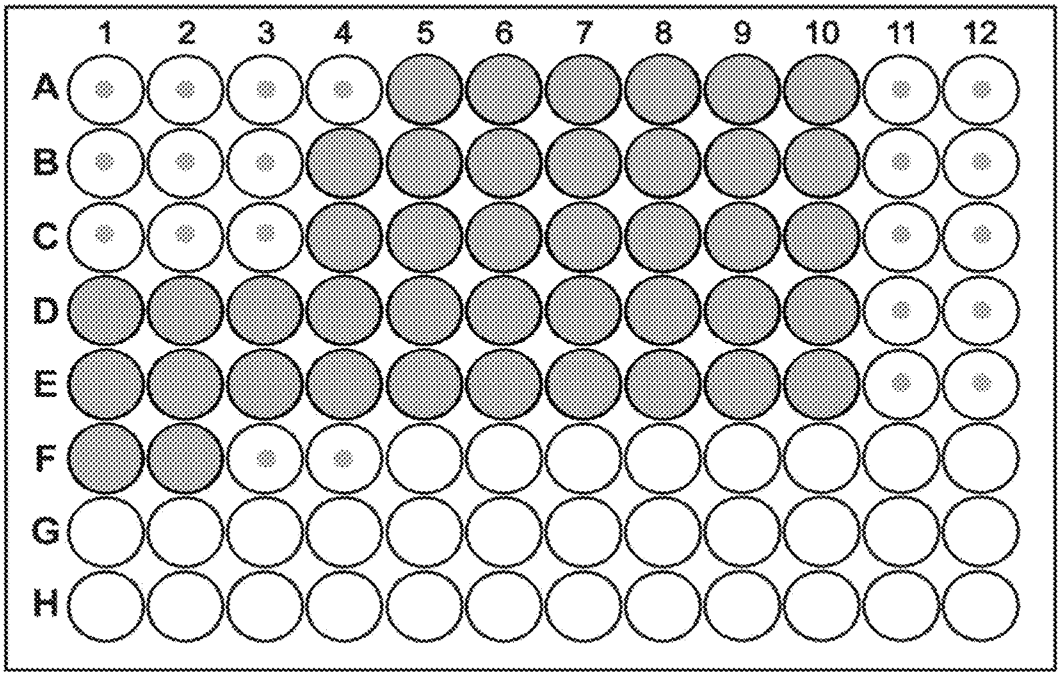
FIG. 4. Schematic representation of a HAI with alive influenza virus from subtype H1N1 (4A) and subtype H3N2 (4B), at a standardised concentration of 4 HAU/25 µl in 1.5% v/v turkey red blood cells (RBC) equivalent to $1.2\times10^7$ cells/ml in phosphate buffered saline solution (PBS). Each row included a different peptide: SEQ ID No. 23 (row A), SEQ ID No.: 22 (row B), SEQ ID No.: 20 (row C), SEQ ID No.: 19 (row D), SEQ ID No.: 21 (row E). Columns 1 to 10 include different dilutions of the corresponding peptide: 2 mg/ml (column 1), 1 mg/ml (column 2), 0.5 mg/ml (column 3), 0.25 mg/ml (column 4), 0.125 mg/ml (column 5), 0.06 mg/ml (column 6), 0.03 mg/ml (column 7), 0.015 mg/ml (column 8), 8 µg/ml (column 9) y 4 µg/ml (column 10). Columns 11 and 12 are control assays including only RBC and the corresponding peptide at a concentration of 2 mg/ml. Wells F1 and F2 contained a control with alive influenza viruses from subtypes H1N1 (FIG. 4A) and subtype H3N2 (FIG. 4B), standardised at a concentration 4 HAU/25 µl and RBC. F3 and F4 correspond to controls containing only RBC.
Figure 4:
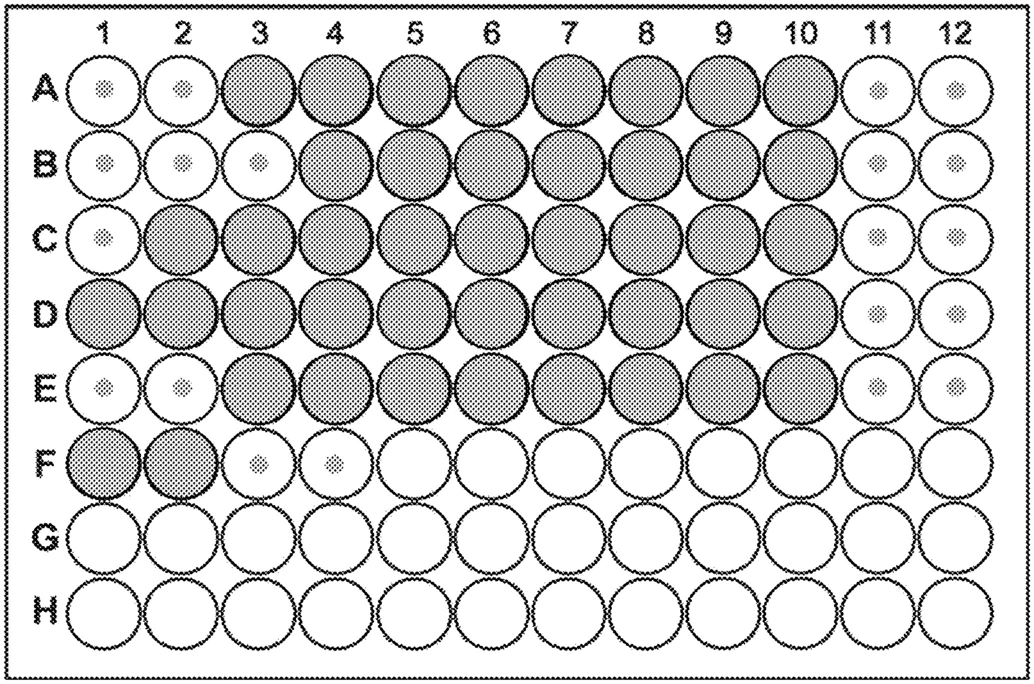

Thus, as shown in examples 2 and 3 and in FIGS. 2, 3 and 4 of the present document, the peptides of the invention block the binding between the HA of the virus and the sialic acid of the cell, inhibiting the adhesion stage and, therefore, the first stage of infection.

Accordingly, one embodiment of the present invention relates to a method for detecting a peptide for use in the prevention and/or treatment of influenza comprising:

- extracting and quantifying DNA from at least one oropharyngeal mucosa sample in vitro;
- obtaining at least one library from said extracted DNA;
- expressing the cloned genes from each library;
- processing the produced proteins by separating them into different fractions according to their molecular weight;
- screening the produced proteins and peptides by HAI assay in the presence of these proteins and peptides.

In another embodiment of the present invention said microorganism is a coronavirus and the screening comprises assessing the binding of the coronavirus spike protein(S) to a cell in the presence of the expressed proteins and peptides.

Therefore, one embodiment of the present invention relates to a method for detecting a peptide for the prevention and/or treatment of a coronavirus infection comprising:

- extracting and quantifying DNA from at least one oropharyngeal mucosa sample in vitro;
- obtaining at least one library from said extracted DNA;
- expressing the cloned genes from each library;
- processing the produced proteins by separating them into different fractions according to their molecular weight;
- screening produced proteins and peptides by assessing the binding of the coronavirus spike protein(S) to a cell in the presence of these proteins and peptides.

For the purposes of the present invention, the term "comprises" indicates that it includes a group of features but does not exclude the presence of other additional features, provided that the presence of the other additional features does not render the claim impracticable. In addition, the terms "consists of", "contains", "includes", "has", "encompasses" and synonyms of such terms are to be construed in the same manner as the term "comprises".

Additionally, for the purposes of the present invention, the term "comprises" may be replaced by any of the terms "includes", "consists of", "substantially consists of" or "substantially consist in". Thus, where the term "comprises" refers to a group of technical features A, B and C, it should be construed as including, additionally, other technical features in addition to technical features A, B and C, provided that the presence of the other features does not render the claim impracticable; but may also be construed as comprising only such features A, B and C or substantially such features A, B and C, and therefore the term "comprises" referring to a group comprising features A, B and C is to be construed as including a group consisting of features A, B and C, or consisting substantially of features A, B and C.

Consequently, the present invention relates to a peptide comprising a sequence SEQ ID No.: 1 (LEK-42), or a derivative thereof, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. In one embodiment, said peptide consists of the sequence SEQ ID No.: 1. Preferably said derivative of the peptide of SEQ ID No: 1 is a peptide comprising or consisting of a sequence SEQ ID No: 19.

In another embodiment, the invention relates to a peptide for use comprising a sequence selected from the group consisting of SEQ ID No.: 1, 2, 3, 4, 5, 6, 7, 8 and 17 or a derivative thereof comprising a sequence selected from the group consisting of SEQ ID Nos.: 19, 20, 21, 22, 23, 24, 25, 26 and 32. In a preferred embodiment, the invention relates to a peptide for use consisting of a sequence selected from the group consisting of SEQ ID No.: 1, 2, 3, 4, 5, 6, 7, 8 and 17. In another preferred embodiment, the present invention relates to a peptide for use comprising a sequence selected from the group consisting of SEQ ID No.: 1, 2, 3, 4 and 5 or a derivative thereof comprising a sequence selected from the group consisting of SEQ ID Nos.: 19, 20, 21, 22 and 23. More preferably, the present invention relates to a peptide consisting of a sequence selected from the group consisting of SEQ ID Nos.: 1, 2, 3, 4 and 5 or a derivative thereof peptide consisting of a sequence selected from the group consisting of SEQ ID Nos.: 19, 20, 21, 22 and 23.

In another embodiment, the present invention relates to a peptide comprising the sequence SEQ ID NO: 2 (LEK-45), or a derivative thereof, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. In one embodiment, said peptide consists of the sequence SEQ ID No: 2. Preferably said derivative of the peptide of SEQ ID No.: 2 is a peptide comprising or consisting of a sequence SEQ ID No.: 20.

Preferably, the present invention relates to a peptide comprising a sequence SEQ ID No.: 3 (SSL-45), or a derivative thereof, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. In one embodiment, said peptide consists of the sequence SEQ ID No.: 3. Preferably said derivative of the peptide of SEQ ID No.: 3 is a peptide comprising or consisting of a sequence SEQ ID No.: 21.

More preferably, the present invention relates to a peptide comprising a sequence SEQ ID No.: 4 (DCD), or a derivative thereof, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus.

In a still more preferred embodiment, the invention relates to a peptide consisting of the sequence SEQ ID No.: 4 or a derivative thereof, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. Preferably said derivative of the peptide of SEQ ID No.: 4 is a peptide comprising or consisting of a sequence SEQ ID No.: 22.

In a still more preferred embodiment, the present invention relates to a peptide comprising a sequence SEQ ID No.: 5 (DCD-1L) or a derivative thereof, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus.

In a still more preferred embodiment, the invention relates to a peptide consisting of the sequence SEQ ID No.: 5 (DCD-1L) or a derivative thereof, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. Preferably said derivative of the peptide of SEQ ID No.: 5 is a peptide comprising or consisting of a sequence SEQ ID No.: 23.

More preferably said virus is an influenza virus, a coronavirus or a morbillivirus. Even more preferably the coronavirus is HcoV-OC43 or SARS-Cov-2, and the morbillivirus is a measles virus.

The sequence SEQ ID No.: 5 is the sequence of the AMP domain of isoform 1 of the human protein dermcidin (see FIG. 1).

In another preferred embodiment, the present invention relates to a peptide for use comprising the sequence SEQ ID No.: 17 or a derivative thereof. More preferably, the invention relates to a peptide consisting of the sequence SEQ ID No.: 17 which is the sequence of human dermcidin described above (isoform 1, NCBI Reference Sequence: NP_444513.1), or a derivative thereof. Preferably said derivative of the peptide of SEQ ID No.: 17 is a peptide comprising or consisting of a sequence SEQ ID No.: 32.

The present invention also relates to a peptide comprising a sequence SEQ ID No.: 1 (LEK-42) or a derivative thereof, for use in the prevention and/or treatment of a disease caused by a virus affecting the respiratory tract, in particular caused by a virus affecting the respiratory tract selected from the group consisting of an influenza virus, a coronavirus or a morbillivirus. Preferably said derivative of the peptide of SEQ ID No.: 1 is a peptide comprising or consisting of a sequence SEQ ID No.: 19.

In another embodiment, the invention relates to a peptide comprising a sequence selected from the group consisting of SEQ ID Nos.: 1, 2, 3, 4, 5, 6, 7, 8 and 17, or a derivative thereof, for use in the prevention and/or treatment of a disease caused by a virus affecting the respiratory tract, in particular caused by a virus affecting the respiratory tract selected from the group consisting of an influenza virus; a coronavirus; and a morbillivirus. In another preferred embodiment, the present invention relates to a peptide consisting of a sequence selected from the group consisting of SEQ ID Nos.: 1, 2, 3, 4 and 5, or a derivative thereof, for use in the prevention and/or treatment of a disease caused by a virus affecting the respiratory tract, in particular caused by a virus affecting the respiratory tract selected from the group consisting of an influenza virus; a coronavirus or a morbillivirus. Preferably said derivatives of the peptides of SEQ ID Nos.: 1, 2, 3, 4, 5, 6, 7, 8 and 17 comprise or consist, respectively, of a peptide of SEQ ID Nos.: 19, 20, 21, 22, 23, 24, 25, 26 and 32.

In another embodiment, the present invention relates to a peptide comprising a sequence SEQ ID No.: 2 (LEK-45), or a derivative thereof, for use in the prevention and/or treatment of a disease caused by a virus affecting the respiratory tract, in particular caused by a virus affecting the respiratory tract selected from the group consisting of an influenza virus; a coronavirus; and a morbillivirus. In one embodiment, said peptide consists of the sequence SEQ ID No: 2. Preferably said derivative of the peptide of SEQ ID No.: 2 is a peptide comprising or consisting of a sequence SEQ ID No.: 20.

Preferably, the present invention relates to a peptide comprising a sequence SEQ ID No.: 3 (SSL-45) or a derivative thereof, for use in the prevention and/or treatment of a disease caused by a virus affecting the respiratory tract, in particular caused by a virus affecting the respiratory tract selected from the group consisting of an influenza virus; a coronavirus and a morbillivirus. In one embodiment, said peptide consists of the sequence SEQ ID No.: 3. Preferably said derivative of the peptide of SEQ ID No.: 3 is a peptide comprising or consisting of a sequence SEQ ID No.: 21.

More preferably, the present invention relates to a peptide comprising a sequence SEQ ID No.: 4 (DCD) or a derivative thereof, for use in the prevention and/or treatment of a disease caused by a virus affecting the respiratory tract, in particular caused by a virus affecting the respiratory tract selected from the group consisting of an influenza virus; a coronavirus; and a morbillivirus.

In a still more preferred embodiment, the invention relates to a peptide consisting of the sequence SEQ ID No.: 4 or a derivative thereof, for use in the prevention and/or treatment of a disease caused by a virus affecting the respiratory tract, in particular caused by a virus affecting the respiratory tract selected from the group consisting of an influenza virus; a coronavirus; and a morbillivirus. Preferably said derivative of the peptide of SEQ ID No.: 4 is a peptide comprising or consisting of a sequence SEQ ID No.: 22.

In a still more preferred embodiment, the present invention relates to a peptide comprising a sequence SEQ ID No.: 5 (DCD-1L) or a derivative thereof, for use in the prevention and/or treatment of a disease caused by a virus affecting the respiratory tract, in particular caused by a virus affecting the respiratory tract selected from the group consisting of an influenza virus; a coronavirus; and a morbillivirus.

In a still more preferred embodiment, the invention relates to a peptide consisting of the sequence SEQ ID No.: 5 or a derivative thereof, for use in the prevention and/or treatment of a disease caused by a virus affecting the respiratory tract, in particular caused by a virus affecting the respiratory tract selected from the group consisting of an influenza virus; a coronavirus; and a morbillivirus. Preferably said derivative of the peptide of SEQ ID No.: 5 is a peptide comprising or consisting of a sequence SEQ ID No.: 23.

Additionally, the present invention relates to a pharmaceutical composition containing at least one peptide comprising a sequence selected from the group consisting of SEQ ID No.: 1, 2, 3, 4, 5, 6, 7, 8 and 17, or a derivative thereof, or any combination of such peptides, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. Preferably said derivatives of the peptides of SEQ ID Nos.: 1, 2, 3, 4, 5, 6, 7, 8 and 17 are, each, a peptide comprising or consisting, respectively, of a sequence SEQ ID Nos.: 19, 20, 21, 22, 23, 24, 25, 26 and 32. In one embodiment, the present invention relates to a pharmaceutical composition containing at least one peptide comprising a sequence SEQ ID No.: 1 or a sequence SEQ ID No.: 19, or comprising a sequence SEQ ID No.: 2 or a sequence SEQ ID No.: 20, preferably comprising a sequence SEQ ID No.: 3 or a sequence SEQ ID No.: 21, more preferably comprising a sequence SEQ ID No.: 4 or a sequence SEQ ID No.: 22 and, still more preferably, comprising a sequence SEQ ID No.: 5 or a sequence SEQ ID No.: 23, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. The present invention also relates to a pharmaceutical composition comprising at least one peptide consisting of a sequence selected from the group consisting of SEQ ID No.: 1, 2, 3, 4, 5, 6, 7, 8 and 17, or a derivative thereof, or any combination of such peptides, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. Preferably said derivatives of the peptides of SEQ ID Nos.: 1, 2, 3, 4, 5, 6, 7, 8 and 17 are, each, a peptide comprising or consisting, respectively, of a sequence SEQ ID Nos.: 19, 20, 21, 22, 23, 24, 25, 26 and 32. In one embodiment, the present invention relates to a pharmaceutical composition comprising at least one peptide consisting of the sequence SEQ ID No: 1, or a derivative thereof, preferably of sequence SEQ ID No.: 19, or consisting of the sequence SEQ ID No.: 2 or a derivative thereof, preferably of sequence SEQ ID No.: 20, preferably consisting of the sequence SEQ ID No.: 3 or a derivative thereof, preferably of sequence SEQ ID No.: 21, and more preferably consisting of the sequence SEQ ID No.: 4 or a derivative thereof, preferably of sequence SEQ ID No.: 22, and even more preferably consisting of the sequence SEQ ID No.: 5 or a derivative thereof, preferably of sequence SEQ ID No.: 23, for use in the prevention and/or treatment of a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. In an also preferred embodiment, the peptide comprises or consists of a sequence SEQ ID No.: 17, or a derivative thereof, preferably of sequence SEQ ID No.: 32.

Another aspect of the present invention relates to a pharmaceutical composition containing at least one peptide characterised in that it comprises a sequence selected from the group consisting of SEQ ID Nos.: 1, 2, 3, 4, 5, 6, 7, 8 and 17, or a derivative thereof, or any combination of such peptides, for use in the prevention and/or treatment of a disease caused by a virus affecting the respiratory tract, in particular caused by a virus affecting the respiratory tract selected from the group consisting of an influenza virus; a coronavirus; and a morbillivirus. Preferably said derivatives of the peptides of SEQ ID Nos.: 1, 2, 3, 4, 5, 6, 7, 8 and 17 are, each, a peptide comprising or consisting, respectively, of a sequence SEQ ID Nos.: 19, 20, 21, 22, 23, 24, 25, 26 and 32. In one embodiment, the present invention relates to a pharmaceutical composition containing at least one peptide comprising a sequence SEQ ID No.: 1, or a derivative thereof, preferably of sequence SEQ ID No.: 19, or comprising a sequence SEQ ID No.: 2 or a derivative thereof, preferably of sequence SEQ ID No.: 20, preferably comprising a sequence SEQ ID No.: 3 or a derivative thereof, preferably of sequence SEQ ID No.: 21, more preferably comprising a sequence SEQ ID No.: 4 or a derivative thereof, preferably of sequence SEQ ID No.: 22 and, still more preferably, comprising a sequence SEQ ID No.: 5 or a derivative thereof, preferably of sequence SEQ ID No.: 23, for use in the prevention and/or treatment of a disease caused by a virus affecting the respiratory tract, in particular caused by a virus affecting the respiratory tract selected from the group consisting of an influenza virus; a coronavirus and a morbillivirus. The present invention also relates to a pharmaceutical composition comprising at least one peptide consisting of a sequence selected from the consisting of SEQ ID No.: 1, 2, 3, 4, 5, 6, 7, 8 and 17, or a derivative thereof, or any combination of such peptides, for use in the prevention and/or treatment of a disease caused by a virus affecting the respiratory tract, in particular caused by a virus affecting the respiratory tract selected from the group consisting of an influenza virus; a coronavirus and a morbillivirus. In one embodiment, the present invention relates to a pharmaceutical composition comprising at least one peptide consisting of a sequence SEQ ID No.: 1, or a derivative thereof, preferably of sequence SEQ ID No.: 19, or consisting of a sequence SEQ ID No.: 2 or a derivative thereof, preferably of sequence SEQ ID No.: 20, preferably consisting of a sequence SEQ ID No.: 3 or a derivative thereof, preferably of sequence SEQ ID No.: 21, and more preferably consisting of a sequence SEQ ID No.: 4 or a derivative thereof, preferably of sequence SEQ ID No.: 22, and even more preferably consisting of a sequence SEQ ID No.: 5 or a derivative thereof, preferably of sequence SEQ ID No.: 23, for use in the prevention and/or treatment of a disease caused by a virus affecting the respiratory tract, in particular caused by a virus affecting the respiratory tract selected from the group consisting of an influenza virus; a coronavirus; and a morbillivirus. In an also preferred embodiment, the peptide comprises or consists of a sequence SEQ ID No.: 17, or a derivative thereof, preferably of sequence SEQ ID No.: 32.

A further embodiment of the present invention relates to the use of at least one peptide, or of a pharmaceutical composition containing at least one peptide or any combination thereof, wherein said peptide comprises a sequence selected from the group consisting of SEQ ID No.: 1, 2, 3, 4, 5, 6, 7, 8 and 17, or a derivative thereof, for the preparation of a medicament for the prevention and/or treatment of a disease caused by a virus affecting the respiratory tract, in particular caused by a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. Preferably said derivatives of the peptides of SEQ ID Nos.: 1, 2, 3, 4, 5, 6, 7, 8 and 17 are, each, a peptide comprising or consisting, respectively, of a sequence SEQ ID Nos.: 19, 20, 21, 22, 23, 24, 25, 26 and 32. In a preferred embodiment said peptide comprises a sequence SEQ ID No.: 1, or a derivative thereof, preferably of sequence SEQ ID No.: 19, or comprises a sequence SEQ ID No.: 2 or a derivative thereof, preferably of sequence SEQ ID No.: 20, preferably comprises a sequence SEQ ID No.: 3 or a derivative thereof, preferably of sequence SEQ ID No.: 21, more preferably comprises a sequence SEQ ID No.: 4 or a derivative thereof, preferably of sequence SEQ ID No.: 22, and still more preferably comprises a sequence SEQ ID No.: 5 or a derivative thereof, preferably of sequence SEQ ID No.: 23. Another embodiment of the present invention relates to the use of at least one peptide, or of a pharmaceutical composition comprising at least one peptide or combination thereof, wherein said peptide consists of the sequence SEQ ID No.: 1, or a derivative thereof, preferably of sequence SEQ ID No.: 19, or consists of the sequence SEQ ID No.: 2 or a derivative thereof, preferably of sequence SEQ ID No.: 20, and more preferably consists of the sequence SEQ ID No.: 3 or a derivative thereof, preferably of sequence SEQ ID No.: 21, and even more preferably consists of the sequence SEQ ID No.: 4 or a derivative thereof, preferably of sequence SEQ ID No.: 22 and, still more preferably, consists of the sequence SEQ ID No.: 5 or a derivative thereof, preferably of sequence SEQ ID No.: 23, for the preparation of a medicament for the prevention and/or treatment of a disease caused by a virus affecting the respiratory tract, in particular caused by a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus. An also preferred embodiment of the invention relates to the use of at least one peptide, or a pharmaceutical composition comprising the at least one peptide, wherein said peptide comprises or consists of the sequence SEQ ID No.: 17, or a derivative thereof, preferably of sequence SEQ ID No.: 32, for the preparation of a medicament for the prevention and/or treatment of a disease caused by a virus affecting the respiratory tract, in particular caused by a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus.

Another embodiment of the invention relates to a method for preventing and/or treating of a disease caused by a virus affecting the respiratory tract, in particular caused by a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus and an enterovirus, comprising administering an effective amount of at least one peptide comprising a sequence selected from the group consisting of SEQ ID No.: 1, 2, 3, 4, 5, 6, 7, 8 and 17, or a derivative thereof, or of a pharmaceutical composition containing at least one of said peptides or any combination thereof, to a subject in need thereof. Preferably said derivatives of the peptides of SEQ ID Nos.: 1, 2, 3, 4, 5, 6, 7, 8 and 17 are, each, a peptide comprising or consisting, respectively, of a sequence SEQ ID Nos.: 19, 20, 21, 22, 23, 24, 25, 26 and 32. More preferably, said peptide comprises a sequence SEQ ID No: 1, or a derivative thereof, preferably of sequence SEQ ID No.: 19, or comprises a sequence SEQ ID No.: 2 or a derivative thereof, preferably of sequence SEQ ID No.: 20, more preferably comprises a sequence SEQ ID No.: 3 or a derivative thereof, preferably of sequence SEQ ID No.: 21, and even more preferably comprises a sequence SEQ ID No.: 4 or a derivative thereof, preferably of sequence SEQ ID No.: 22 and, still more preferably, comprises a sequence SEQ ID No.: 5 or a derivative thereof, preferably of sequence SEQ ID No.: 23. Another preferred embodiment relates to a method for preventing and/or treating of a disease caused by a virus affecting the respiratory tract, in particular caused by a virus affecting the respiratory tract selected from the group consisting of an influenza virus; a coronavirus; a syncytial virus (RSV); a rhinovirus (RVs); a parainfluenza virus (PIV); an adenovirus (ADV); a morbillivirus or an enterovirus, comprising administering an effective amount of at least one peptide consisting of a sequence selected from the group consisting of SEQ ID No.: 1, 2, 3, 4, 5, 6, 7, 8 and 17, or a derivative thereof, or of a pharmaceutical composition containing at least one of said peptides or any combination thereof, to a subject in need thereof. Preferably, said peptide consists of the sequence SEQ ID No.: 1, or a derivative thereof, preferably of sequence SEQ ID No.: 19, or consists of the sequence SEQ ID No.: 2 or a derivative thereof, preferably of sequence SEQ ID No.: 20, and more preferably consists of the sequence SEQ ID No.: 3 or a derivative thereof, preferably of sequence SEQ ID No.: 21, and even more preferably consists of the sequence SEQ ID No.: 4 or a derivative thereof, preferably of sequence SEQ ID No.: 22 and, still more preferably, consists of the sequence SEQ ID No.: 5 or a derivative thereof, preferably of sequence SEQ ID No.: 23. In an also preferred embodiment, the peptide comprises or consists of a sequence SEQ ID No.: 17, or a derivative thereof, preferably of sequence SEQ ID No.: 32.

Preferably, the peptide, for use in the embodiments and methods of preventing and/or treating of a disease caused by a virus affecting the respiratory tract disclosed in present invention, is a derivative of one of the sequences selected from the group consisting of SEQ ID Nos.: 1, 2, 3, 4, 5, 6, 7, 8, 9, 10, 11, 12, 13, 14, 15, 16 and 17. For the purposes of the present invention, a derivative of the peptide is defined as a peptide having a sequence in which at least one aminoacid is different from the aminoacid present in the initial sequence, because said aminoacid has been artificially modified or replaced. Preferably said derivative comprises at least one modified aminoacid which is acetylated, methylated, formylated, amidated or phosphorylated, even more preferably said at least one aminoacid is acetylated. Preferably said dermcidin derivative may also be an aminoacidic sequence having at least 80%, preferably at least 90%, and more preferably at least 95% sequence identity, with any of the aminoacidic sequences SEQ ID Nos.: 1, 2, 3, 4, 5, 6, 7, 8, 9, 10, 11, 12, 13, 14, 15, 16 and 17, disclosed in table 1 herein. Thus, in another preferred embodiment the peptide, for use in the embodiments and methods of preventing and/or treating of a disease caused by a virus affecting the respiratory tract disclosed in present invention, comprises or consists of a sequence having at least 80%, preferably at least 90%, and more preferably at least 95% sequence identity, with any of sequences SEQ ID Nos.: 1, 2, 3, 4, 5, 6, 7, 8, 9, 10, 11, 12, 13, 14, 15, 16 and 17, disclosed in table 1 herein.

In one embodiment, the peptide of sequence SEQ ID No.: 17 is the human protein dermcidin and the peptides disclosed in the present invention, comprising or consisting of a sequence SEQ ID Nos: 1, 2, 3, 4, 5, 6, 7, 8, 9, 10, 11, 12, 13, 14, 15 and 16 are the result from the natural enzymatic processing or an artificial processing of said protein into fragments having a purposely selected cytotoxic activity against viruses. In one embodiment the peptides comprising or consisting of a sequence SEQ ID Nos: 1, 2, 3, 4, 5, 6, 7, 8, 9, 10, 11, 12, 13, 14, 15, 16 and 17 are synthesized by a method known in the art. In another embodiment the peptides disclosed in the present invention comprise at least one acetylated aminoacid, more preferably, said peptides comprise or consist of a sequence SEQ ID No: 19, 20, 21, 22, 23, 24, 25, 26, 27, 28, 29, 30, 31 and 32.

For the purposes of the present invention, the term "effective amount" shall be understood as an amount that provides a therapeutic effect without causing unacceptable toxic effects to the patient. The effective amount or dose of the medicament depends on the compound administered and, on the condition or disease treated, and for example the age, weight and clinical condition of the treated patient, the form of administration, the clinical history of the patient, the seriousness of the disease and the potency of the compound administered.

In a preferred embodiment the peptide comprises or consists of the sequence SEQ ID Nos.: 1, 2, 3, 4 or 5, or a derivative thereof and the disease caused by a virus affecting the respiratory tract is, in particular, caused by the influenza virus, and such virus comprises the H1N1 subtype. More preferably the derivative comprises or consists, respectively, of a sequence SEQ ID Nos.: 19, 20, 21, 22 or 23.

In another preferred embodiment, the peptide comprises or consists of the sequence SEQ ID Nos.: 2, 3, 4 or 5, or a derivative thereof, and the disease caused by a virus affecting the respiratory tract is, in particular, caused by the influenza virus and such virus comprises the H1N1 subtype or H3N2 subtype. More preferably the derivative comprises or consists, respectively, of a sequence SEQ ID Nos.: 20, 21, 22 or 23.

In yet another preferred embodiment the peptide comprises or consists of the sequence SEQ ID Nos.: 4 or 5, or a derivative thereof, and the disease caused by a virus affecting the respiratory tract is, in particular, caused by a coronavirus, in particular HcoV-OC43 or SARS-Cov-2. More preferably the derivative comprises or consists, respectively, of a sequence SEQ ID Nos.: 22 or 23.

In yet another preferred embodiment the peptide comprises or consists of the sequence SEQ ID Nos.: 4 or 5, or a derivative thereof, and the disease caused by a virus affecting the respiratory tract is, in particular, caused by a morbillivirus, in particular a measles virus. More preferably the derivative comprises or consists, respectively, of a sequence SEQ ID Nos.: 22 or 23.

The compositions for use according to the present invention include, together with the peptides described in the present invention, at least one pharmaceutically acceptable excipient, which may be, inter alia, a carrier or diluent. Optionally, the compositions for use according to the present invention include, together with the peptides described in the present invention and at least one pharmaceutically acceptable excipient, at least a second active ingredient or at least one adjuvant.

Such compositions may be presented in pharmaceutical forms, such as: capsules, pills, sachets, or envelopes or any other type of presentation. In particular, such compositions may preferably be presented in the form of aerosols, mouthwashes, gels, mucosal adhesion lipid systems and hand wipes.

Conventional techniques for preparing pharmaceutical compositions can be used to prepare said compositions. For example, the compound of interest may be mixed with a carrier or diluted in a carrier or contained in a carrier in the form of an ampoule, capsule, pill, sachet, envelope or other container and, in particular, in aerosols, mouthwashes, aqueous or hydroalcoholic gels and in wet wipes. When the carrier acts as a solvent it may be solid, semi-solid, or liquid, and act as an excipient or medium for said active compound. The peptide of interest can be adsorbed in a solid granular medium. Some examples of suitable vehicles are water, saline solutions, alcohols, polyethylene glycols, polyhydroxyethoxylated castor oil, peanut oil, olive oil, lactose, terra alba, saccharose, cyclodextrins, amylose, magnesium stearate, talcum, gelatine, agar, pectin, acacia, stearic acid, cellulose alkyl ethers, silicic acid, fatty acids, fatty acid amines, fatty acid monoglycerides and diglycerides, fatty esters of pentaerythritol, polyethylene, hydroxymethylcellulose and polyvinylpyrrolidone. Likewise, the carrier can include prolonged release materials known in the prior art, such as glyceryl monostearate or distearate, alone or mixed with a wax. The formulations can also include wetting agents, emulsifiers, suspension agents, preservatives, sweeteners or flavourers. The compositions can be formulated to provide a quick, prolonged or delayed release of the active agent after administration to the patient using known methods in the prior art.

The pharmaceutical compositions can be sterilized and mixed, if desired, with additional agents, emulsifiers, salts to influence osmotic pressure, buffers, and/or colourants that do not react adversely with the active compounds.

One embodiment of the present invention also relates to the form of administration, which can be any mode that effectively transports the peptide of interest to the desired site of action, such as oral, rectal or parenteral modes of administration, for example topical, subcutaneous, intravenous, intraurethral, intramuscular, intranasal or as an ophthalmic solution. In particular, the compositions can preferably be administered by skin contact, such as in soaps, aqueous or hydroalcoholic gels, or in wet wipes. In addition, preferably the compositions can be administered nasally, or orally, in aerosols or mouthwashes.

The peptides of the invention can also be formulated in nanoparticles, liposomes, nanoemulsions, esterified or conjugated with a polyethylene glycol group, in polymeric matrices, or formulated in such a way as to improve their bioavailability, together with other aminoacids, chitosan or fatty acids.

For oral administration, both solid and liquid dosing forms can be prepared. To prepare solid forms such as pills, the compound of interest is mixed in a formulation with other conventional ingredients such as talcum, magnesium stearate, dicalcium phosphate, aluminium and magnesium silicate, starch, lactose, acacia, methylcellulose and functionally similar materials as pharmaceutical carriers and diluents.

The capsules can be prepared by mixing the compound of interest with a pharmaceutically inert solvent and filling the mixture in a hard gelatine with the suitable size. Soft capsules are prepared with encapsulation machines for suspensions of the compound of interest with an acceptable vegetable oil, light paraffin or inert oil. Liquid dosing forms can also be prepared, such as syrups, elixirs and suspensions. Water-soluble forms can be dissolved in an aqueous medium with sugar, flavouring aromas and preservatives to form a syrup. Elixirs are prepared using a hydroalcoholic carrier (such as ethanol) with suitable sweeteners such as sugar or saccharin, together with flavouring aromas. Suspensions can be prepared with an aqueous carrier and a suspension agent such as acacia, tragacanth, methylcellulose and the like.

For parenteral application, a person skilled in the art will find it obvious to use injectable solutions or suspensions, for intradermal, intramuscular, intravascular and subcutaneous use. In addition to the compound of interest, the compositions may include other pharmaceutically acceptable nontoxic diluents and excipients, including carriers commonly used in pharmaceutical compositions for humans or animals, as well as lipid systems that aid retention in mucous membranes for continued release. The diluent is selected so that it does not affect the biological activity of the composition.

Examples of diluents especially used in injectable formulations are organic and inorganic salt solutions, Ringer's solution, dextrose solution and Hank's solution. In addition, the compositions can include additives such as other excipients, adjuvating agents, non-therapeutic and non-immunogenic stabilizers and the like.

Examples of excipients that can be included in the formulation include but are not limited to cosolvents, surfactants, oils, wetting agents, emollients, preservatives, stabilizers and antioxidants. Any physiologically acceptable buffer can be used, such as Tris or phosphate buffers. Effective amounts of diluents, or additives or excipients are those that are effective for obtaining a pharmaceutically acceptable formulation with regard to solubility and biological activity.

Another embodiment relates to the dosing regimen. The term unit dose refers to physically discrete units suitable as unit doses for an individual, wherein each unit contains a predetermined amount of active material calculated to produce the appropriate therapeutic effect in association with the appropriate diluent, support or carrier.

Additionally, the present invention relates to a method for determining in vitro the level of resistance of an individual to being infected with a virus affecting the respiratory tract, wherein said method comprises determining the total concentration of a peptide comprising a sequence SEQ ID No.: 17 and of any fragment thereof of sequences SEQ ID Nos.: 1, 2, 3, 4, 5, 6, 7, 8, 9, 10, 11, 12, 13, 14, 15 or 16, as disclosed in table 1 herein, in a saliva sample; wherein the higher the concentration of said peptides in the sample is, the greater the resistance of said individual is to being infected with said virus. Thus, the invention also discloses a method for determining in vitro the level of resistance of an individual to being infected with a virus affecting the respiratory tract, wherein said method comprises determining in vitro the total concentration of peptides of sequences SEQ ID Nos. 1, 2, 3, 4, 5, 6, 7, 8, 9, 10, 11, 12, 13, 14, 15, 16 or 17. Preferably, the virus affecting the respiratory tract is an influenza virus, a coronavirus or a morbillivirus. Preferably, the determination of the peptide's concentration is performed by immunoassay, and more preferably using antibodies specific for binding to a peptide comprising any of sequences SEQ ID Nos. 1 to 17, as disclosed in table 1 herein.

As shown in example 4, the method developed qualitatively and quantitatively detects dermcidin in a saliva sample in a painless, non-invasive and simple manner.

Figure 9:
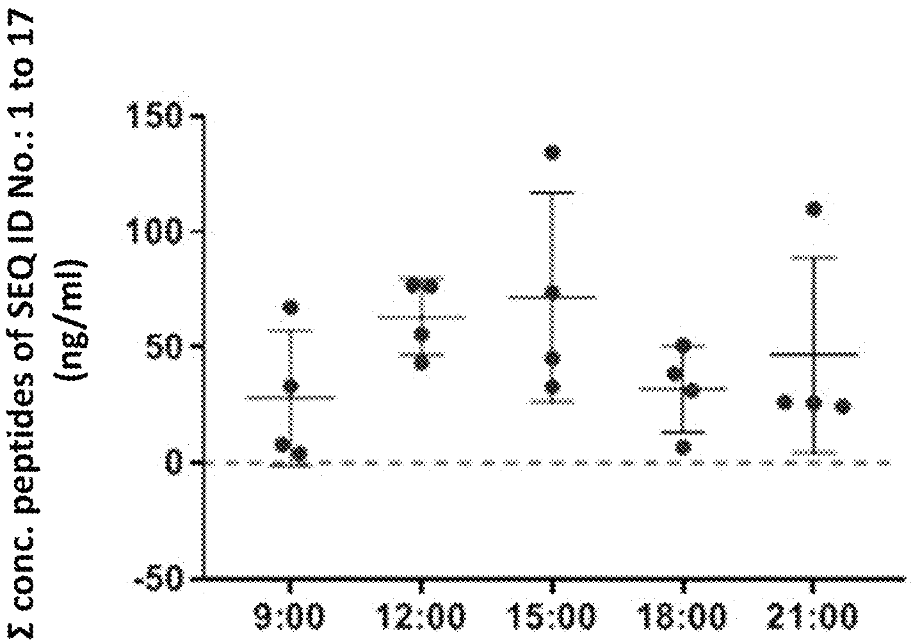
FIG. 9. Total concentration of peptides with sequence SEQ ID No.: 17 or a fragment thereof (SEQ ID Nos.: 1 to 16) in ng/ml in saliva samples from 4 volunteers taken at different times during a single day (at 9, 12, 15, 18 and 21 hours). Measurements were taken by immunoassay test (ELISA), according to the method of example 4.

Furthermore, as shown in FIG. 9, the total levels of dermcidin peptides of SEQ ID No: 17 or a fragment thereof of any of sequences SEQ ID Nos.: 1, 2, 3, 4, 5, 6, 7, 8, 9, 10, 11, 12, 13, 14, 15 or 16, as disclosed in table 1 herein, measured do not vary significantly throughout the day. This suggests that the concentration of peptides with a sequence SEQ ID No.: 17 or a fragment thereof (i.e. the total concentration of peptides of sequences SEQ ID Nos. 1, 2, 3, 4, 5, 6, 7, 8, 9, 10, 11, 12, 13, 14, 15, 16 or 17), in saliva is not dependent on the circadian rhythm, so that the time of day at which the sample is taken would not affect their determination. This facilitates the use of the method to determine in vitro the level of resistance of an individual to being infected with a virus affecting the respiratory tract, according to the present invention, as the measurements could be taken in the morning or in the evening, conforming to the schedules of clinics or health centres.

For the purposes of the present invention the terms "viruses affecting the respiratory tract", "respiratory virus", "viral diseases of the respiratory tract", or the like, refer to diseases that present adverse symptoms in the respiratory tract and are caused by a virus. Preferably, said virus affecting the respiratory tract is selected from the group consisting of an influenza virus; a coronavirus, selected from the group consisting of human coronavirus OC43 (the main cause of common cold), SARS, MERS and SARS-COV-2;

a syncytial virus (RSV); a rhinovirus (RVs); a parainfluenza virus (PIV); an adenovirus (ADV); a morbillivirus such as the measles virus and an enterovirus, such as ENV-D68. In a preferred embodiment the virus affecting the respiratory tract is an influenza virus, a coronavirus or a morbillivirus. In a more preferred embodiment, the coronavirus is HcoV-OC43 or SARS-Cov-2, the morbillivirus is a measles virus and, the influenza virus comprises an H1N1 subtype and/or an H3N2 subtype.

As indicated previously in this disclosure, once dermcidin (SEQ ID No.: 17) is secreted, is processed or fragmented to give rise to different dermcidin fragments of SEQ ID Nos.: 1 to 16 described in table 1 of present description.

Figure 8:
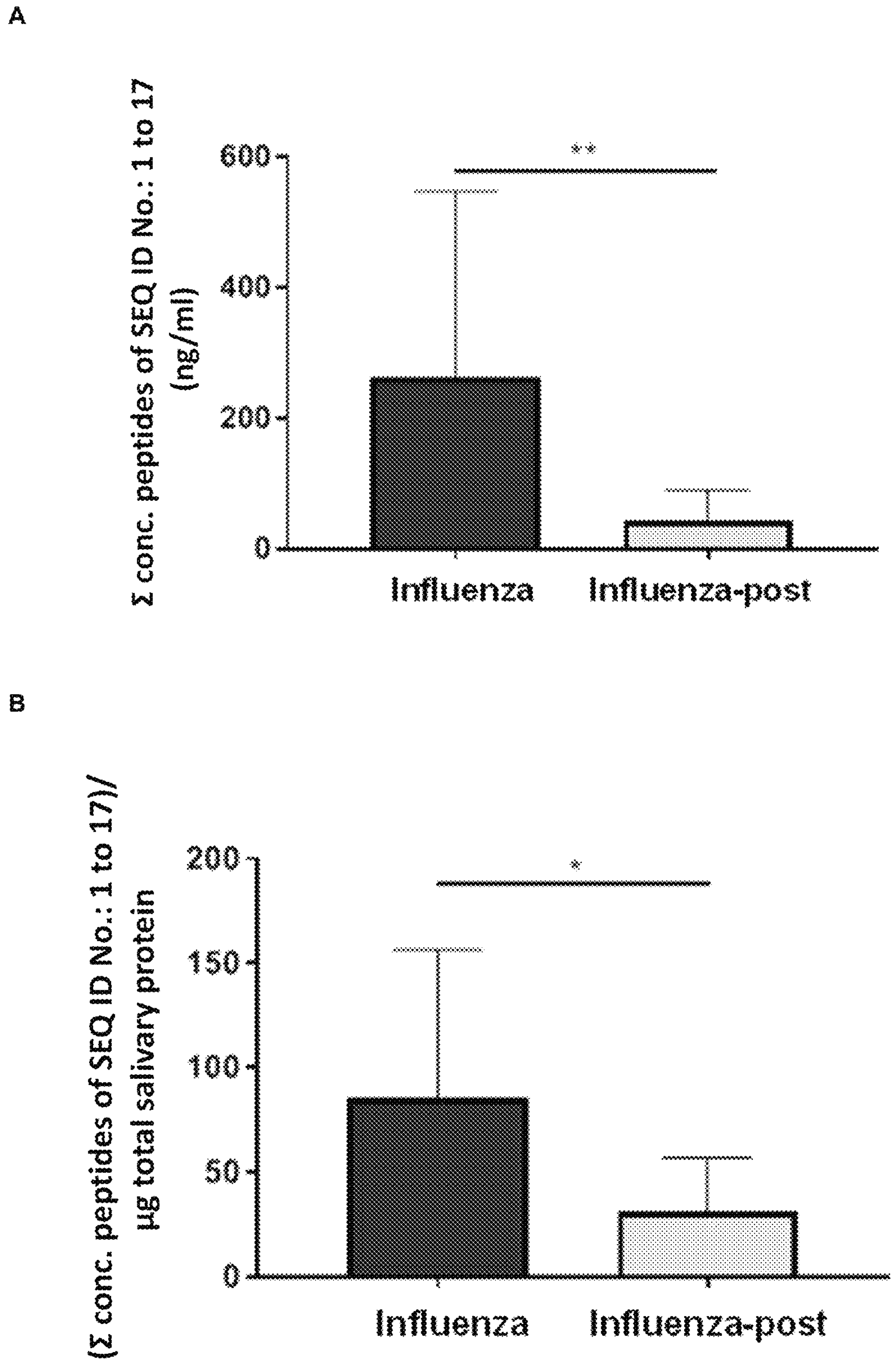
FIG. 8. Total levels of peptides with sequence SEQ ID No.: 17 or a fragment thereof (SEQ ID No.: 1 to 16), in ng/ml (8A) and ng/ug total salivary protein (8B) in saliva samples from 20 people with influenza at the time of hospital admission ("Influenza") and 6 months after suffering symptoms of the disease ("Influenza-post"). The difference is statistically significant (8A p-value=0.0032, 8B p-value=0.012). Measurements were obtained by immunoassay test (ELISA), according to the method of example 4.

On the other hand, as shown in FIG. 8, the production of dermcidin (SEQ ID No.: 17) and, consequently, of the fragments thereof of any of sequences SEQ ID Nos.: 1, 2, 3, 4, 5, 6, 7, 8, 9, 10, 11, 12, 13, 14, 15 or 16, as disclosed in table 1 (i.e. the total concentration of peptides of sequences SEQ ID Nos. 1, 2, 3, 4, 5, 6, 7, 8, 9, 10, 11, 12, 13, 14, 15, 16 or 17), is significantly higher in people infected with, in this case, the influenza virus, during influenza infection, when compared to their basal levels in the absence of infection. This demonstrates that production of these peptides (dermcidin and fragments thereof) is stimulated in response to infection by a respiratory virus, in this case influenza, and is therefore an indication of their usefulness in the prevention and/or treatment of such disease as protected by the present invention.

Another embodiment of the present invention relates to a kit for determining in vitro the level of resistance of an individual to being infected by a virus affecting the respiratory tract, wherein said kit comprises means for analysing the total concentration of peptides comprising a sequence SEQ ID No.: 17 or a fragment thereof of any of sequences SEQ ID Nos.: 1, 2, 3, 4, 5, 6, 7, 8, 9, 10, 11, 12, 13, 14, 15 or 16, in a saliva sample. In a preferred embodiment the virus affecting the respiratory tract is an influenza virus, a coronavirus or a morbillivirus. In a more preferred embodiment, the coronavirus is HcoV-OC43 or SARS-Cov-2, the morbillivirus is a measles virus and influenza virus comprises an H1N1 subtype and/or an H3N2 subtype.

For the purposes of the present invention, the saliva sample used in the method and kit of the invention is an ex vivo sample.

In a preferred embodiment, the peptide concentration is determined by immunoassay. More preferably, the peptide concentration is determined using antibodies specific for dermcidin, i.e. antibodies specific for a peptide comprising a sequence SEQ ID No. 17: or a fragment thereof of any of sequences SEQ ID Nos.: 1, 2, 3, 4, 5, 6, 7, 8, 9, 10, 11, 12, 13, 14, 15 or 16.

EXAMPLES

The examples described below are for purposes of illustration only and are not meant to limit the scope of the present invention.

Example 1: Method for the Detection of Peptides with Antiviral Activity

This example allowed identifying dermcidin (SEQ ID No.: 17), and fragments thereof as disclosed in table 1 herein, as a human protein that inhibits haemagglutination of the influenza virus and thus protects against influenza virus infection.

Sample Collection and Processing

Human phage lambda libraries were obtained from the DNA of oral and oropharyngeal mucosal samples (Veterinary Microbiology, Vol. 76(4), 2000, 359-372). For this purpose, after each volunteer signed the informed consent, the following samples were taken: 1) a cheek mucosa sample (M), by rubbing both cheeks gently with a sterile swab; 2) an oropharyngeal mucosa sample (OF), by gently rubbing a swab over the oropharyngeal area, and 3) a gargle sample (W), performed for 30 seconds with a volume of 20 ml of saline solution, which was then collected. Each of the samples from the 19 volunteers were transferred under cold conditions to the laboratory, where they were stored at −20° C. until they were processed for the elaboration of the libraries.

Obtaining the Libraries

For the extraction of DNA from the 57 samples (3 samples from each of the 19 volunteers), the Gentra Puregene Buccal Cell Kit, specific for extracting DNA from buccal cells, was used. After quantifying the extracted DNA with a NanoDrop® pedestal spectrophotometer, the samples with the highest concentration were selected to perform the libraries. This DNA was then partially digested with the restriction enzyme Sau3A and run on a low melting point agarose gel at 4° C. overnight to clearly observe the banding pattern. The next day, the DNA band of adequate size between 9 and 10 Kb was cut and treated with gelase enzyme to remove the DNA from the gel, following the supplier's recommendations (Epicenter Tech). Finally, the DNA was concentrated with Microcon YM-100 columns (Millipore).

The ZAP Express® Predigested Vector Kit (Stratagene, La Jolla, CA), which provides the partial genome of the lambda phage digested with the Bam H1 enzyme, was used as a vector for the construction of the human DNA libraries. The process was performed according to the manufacturer's instructions (ligation of the partially digested human DNA with the expression vector, packaging into phage particles, titration of the libraries and amplification of the libraries). In total, 6 final libraries of between 10,000 and 100,000 clones each were obtained.

Amplification, Filtering and Concentration

The phage mixtures of each library were then amplified individually in order to increase the amount of expressed proteins. For this, an aliquot of each of the clone mixtures in their respective phages was incubated with XL1-Blue MRF *E. coli* cells for 15 minutes at 37° C. After infection, serial dilutions were plated on NZY Agar plates and incubated at 37° C. overnight. The next day, the expressed proteins were recovered together with the amplified phages following the protocol of the ZAP Express Predigested Vector Kit and ZAP Express Predigested Gigapack Cloning Kits BamH I/CIAP-Treated (Agilent Technologies). After recovering the proteins expressed during infection, they were pooled into different mixtures and filtered through 0.2 μm and 100 kDa filters to remove cell debris and phages, respectively, and to avoid possible interference in the assay.

Finally, the resulting sample was filtered with 2 kDa filters (Vivacon 2 2 kDa centrifugal concentrators; 7500×g, 99 minutes, 4° C.) with the dual aim of concentrating the solution and obtaining, separately, all proteins larger and smaller than 2 kDa, respectively, to screen both fractions against the influenza virus.

Screening Against Influenza Virus

After performing the respective controls, such as titration of the standardised antigen, detection of non-specific agglutinins in the mixtures of proteins from the phages with insert and in the controls without insert, the Haemagglutination Inhibition assay (HAI) was performed for each of the mixtures of each library following the WHO Manual (WHO Global Influenza Surveillance Network, "Manual for the laboratory diagnosis and virological surveillance of virological surveillance of influenza"), as a screening test to determine their possible activity against influenza virus infection.

The HAI technique is based on the ability of influenza viruses to agglutinate red blood cells due to the viral protein haemagglutinin (HA). Since HA is involved in the first step of the infection cycle with influenza viruses, the technique developed allows the identification of human peptides that interfere with the influenza virus at the beginning of the infection cycle. The HAI assays were performed following the serological diagnosis of influenza using the WHO HAI assay protocol (WHO Global Influenza Surveillance Network (2011) Manual for the laboratory diagnosis and virological surveillance of influenza; http://www.who.int/influenza/en/).

As a result of the screening, 4 positive samples were obtained from 2 different individuals capable of producing HAI. Since each of these 4 samples was composed of more than 200 different clones, different strategies were used to identify the protein responsible for HAI activity from the rest.

The extract of proteins derived from the library with activity against the influenza virus was analysed by SDS-PAGE (Sodium Dodecyl Sulfate PolyAcrylamide Gel Electrophoresis), specific for visualising low molecular weight proteins, followed by staining with Coomassie-blue dye. The peptide fingerprint analysis of the gel area corresponding to the molecular weight between 1 and 5 kDa was then performed.

The results revealed a mixture of proteins ranging from 1 to 5 kDa, which after additional LC-MS (liquid chromatography-mass spectrometry) analysis allowed us to obtain the aminoacid sequences of the different peptides in the mixture. These sequences were compared with the database of human proteins, resulting in matches with 73 human proteins. Of the 73 peptides present in the sample, three corresponded to fragments of the dermcidin sequence (SEQ ID No.: 17). In this way, a method was developed for the detection in vitro of biological peptides that are active against a virus that affects the respiratory tract, and specifically, in this case, against the influenza virus.

Example 2: In Vitro Assays of Dermcidin Activity Against Influenza Virus

Then, in order to evaluate whether dermcidin, or a fragment thereof, is responsible for inhibiting the haemagglutination caused by the influenza virus, both in H1N1 and H3N2 subtypes, and therefore for blocking the first stage of virus infection, different dermcidin-derived fragments, were synthesised in order to evaluate their activity against the influenza virus, as well as the peptide EB which was used as a control:

TABLE 2

| Synthesised peptides | | |
|---|---|---|
| LEK-42 | SEQ ID No.: 1 | LEKGLDGAKK AVGGLGKLGK DAVEDLESVG KGAVHDVKDV LD |
| LEK-45 | SEQ ID No.: 2 | LEKGLDGAKK AVGGLGKLGK DAVEDLESVG KGAVHDVKDV LDSVL |
| SSL-45 | SEQ ID No.: 3 | SSLLEKGLDG AKKAVGGLGGLGK LGKDAVEDLE SVGKGAVHDV KDVLD |
| DCD | SEQ ID No.: 4 | SSLLEKGLDG AKKAVGGLGK LGKDAVEDLE SVGKGAVHDV KDVLDSV |
| DCD-1L | SEQ ID No.: 5 | SSLLEKGLDG AKKAVGGLGGLGK LGKDAVEDLE SVGKGAVHDV KDVLDSVL |
| SSL-25 | SEQ ID No.: 10 | SSLLEKGLDG AKKAVGGLGK LGKDA |
| LEK-24 | SEQ ID No.: 13 | LEKGLDGAKK AVGGLGKLGK DAVE |
| YDP-42 | SEQ ID No.: 14 | YDPEAASAPG SGNPCHEASA AQKENAGEDP GLARQAPKPR KQ |
| EB | SEQ ID No.: 18 | RRKKAAVALL PAVLLALLAP |

The assays were carried out against both, standardised antigens thereof (example 2.1), as well as the live virus (example 2.2).

Peptide synthesis was based on the solid phase synthesis technique using the Fmoc protection strategy developed by Atherton and Sheppard (Atherton E, Sheppard RC. Solid Phase Peptide Synthesis: A Practical Approach. IRL Press; Oxford: 1989). First, the peptide chain was covalently bonded to an insoluble resin. Then, deprotection of the aminoacid attached to the solid surface, together with activation of the terminal carboxylic acid group of the added aminoacid, led to the attachment of the new aminoacid. By repeating this reaction scheme, stepwise coupling of aminoacids was obtained to achieve the desired peptide with sequence. The final peptide was cleaved from the resin surface by a strong acid.

Hemagglutination Inhibition assays (HAI) were performed following the serological diagnosis of influenza using the WHO haemagglutination inhibition assay protocol (WHO Global Influenza Surveillance Network (2011); Manual for the laboratory diagnosis and virological surveillance of influenza).

The EB peptide of SEQ ID No.: 18, described by Jones et al. (Journal of Virology, December 2006, pages 11960-11967, doi: 10.1128/JVI.01678-06) was used as a positive control.

Example 2.1: In Vitro Assays of Dermcidin Activity Against Standardised Antigens from Influenza Virus Turkey red blood cells at 5% v/v (RBC) as well as antigens of influenza virus samples, of subtypes H1N1 and H3N2, were used for the assays. Different concentrations of RBC (from 1% to 7%) were prepared and the number of cells was quantified with a Neubahuer chamber each day. To standardise the virus antigens, the antigens were titrated to obtain a standardised antigen concentration for the assays of 8 HAU/50 μl (HAU=Haemagglutinin Units) for the H1N1 subtype and 4 HAU/25 μl for the H3N2 subtype.

In the first assay (FIG. 2) the efficacy of one of the peptides of the invention, exemplified by a peptide of aminoacid sequence SEQ ID No.: 5 (DCD-1L) to inhibit haemagglutination of standardised antigens of influenza virus subtypes H1N1 and H3N2, was evaluated in 5% v/v turkey red blood cells (RBC).

Serial dilutions of peptide with sequence SEQ ID No.: 5 in the presence of H1N1 virus standardised to 8 HAU/50 μl and RBC (row A) and H3N2 virus standardised to 4 HAU/25 μl (row C) were thus evaluated; in addition, serial dilutions of EB peptide as a positive control of HAI in the presence of H1N1 virus standardised to 8 HAU/50 μl (row B) and H3N2 virus standardised to 4 HAU/25 μl (row D) were performed. All samples of the peptide were diluted in 3 times its volume to deliver a final concentration which was ¼ of the peptide stock solution. Columns 1 to 10 each include respectively one aliquot of 4 mg/ml (column 1), 2 mg/ml (column 2), 1 mg/ml (column 3), 0.5 mg/ml (column 4), 0.25 mg/ml (column 5), 0.125 mg/ml (column 6), 0.06 mg/ml (column 7), 0.03 mg/ml (column 8), 0.015 mg/ml (column 9), and 8 μg/ml (column 10), of the corresponding stock solution of the peptide. Columns 11 and 12 included the following controls: A11 and A12 contain RBC in the presence of H1N1 virus standardised to 8 HAU/50 μl; B11 and B12 contain 4 mg/ml of the stock solution of the peptide of SEQ ID No.: 5 and RBC; C11 and C12 contain a control with H3N2 virus standardised to 4 HAU/25 μl and RBC; D11 and D12 contain 4 mg/ml of the stock solution of the EB peptide and RBC; and E11 and E12 contain only PBS in the presence of RBC. As can be seen in FIG. 2, the peptide of SEQ ID No.: 5 is active against both H1N1 and H3N2 subtypes, inhibiting haemagglutination.

In a second assay (FIG. 3), the activity of several dermcidin-derived peptides synthesized (see table 2) against the standardised antigens of H1N1 influenza virus subtype was evaluated by HAI.

Serial dilutions were performed of the peptide with sequence SEQ ID No.: 5 (row A), peptide with sequence SEQ ID No.: 14 (row B), peptide with sequence SEQ ID No.: 3 (row D), peptide with sequence SEQ ID No.: 10 (row D), peptide with sequence SEQ ID No.: 2 (row E), peptide with sequence SEQ ID No.: 13 (row F) and peptide with sequence SEQ ID No.: 1 (row G), all against antigens of influenza virus subtype H1N1 standardised to 8 HAU/50 μl. Again, all samples of the peptide were diluted in 3 times its volume to deliver a final concentration which was ¼ of the peptide stock solution. Columns 1 to 10 each include respectively one aliquot of: 4 mg/ml (column 1), 2 mg/ml (column 2), 1 mg/ml (column 3), 0.5 mg/ml (column 4), 0.25 mg/ml (column 5), 0.125 mg/ml (column 6), 0.06 mg/ml (column 7), 0.03 mg/ml (column 8), 0.015 mg/ml (column 9) and 8 ng/ml (column 10), of the corresponding stock solution of the peptide except for row G whose serial dilutions were: 8 mg/ml (column 1), 4 mg/ml (column 2), 2 mg/ml (column 3), 1 mg/ml (column 4), 0.5 mg/ml (column 5), 0.25 mg/ml (column 6), 0.125 mg/ml (column 7), 0.06 mg/ml (column 8), 0.03 mg/ml (column 9) and 0.015 mg/ml (column 10) of the stock solution of the peptide. All of these were tested against the H1N1 influenza virus subtype standardised to 8 HAU/50 μl. Columns 11 and 12 included the following controls: A11 and A12 contain 4 mg/ml of the stock solution of the peptide with sequence SEQ ID No.: 5 and RBC, B11 and B12 contain 4 mg/ml of the stock solution of the peptide with sequence SEQ ID No.: 14 and RBC; C11 and C12 contain 4 mg/ml of the stock solution of the peptide with sequence SEQ ID No.: 3 and RBC; D11 and D12 contain 4 mg/ml of the stock solution of the peptide with sequence SEQ ID No.: 10 and RBC; E11 and E12 contain 4 mg/ml of the stock solution of the peptide with sequence SEQ ID No.: 2 and RBC; F11 and F12 contain 4 mg/ml of the stock solution of the peptide with sequence SEQ ID No.: 13 and RBC; G11 and G12 contain 4 mg/ml of the stock solution of the peptide with sequence SEQ ID No.: 1 and RBC; H1 and H2 contain a control in which only antigens of subtype H1N1 of influenza virus standardised to 8 HAU/50 μl and RBC is included, while H3 and H4 contain only PBS in the presence of RBC.

As can be seen in FIG. 3, only the peptides of SEQ ID Nos: 1, 2, 3 and 5 had activity against antigens of the H1N1 subtype of the influenza virus.

The assays were also carried out using the lysine-acetylated derivatives of the peptides of SEQ ID No.: 1, 2, 3, 5, 10, 13 and 14 of table 2, having said derivatives, respectively, sequences SEQ ID No. 19, 20, 21, 23, 28 and 29. The synthesis of the derivatives was carried out in an analogous manner as the one reported for the peptides of table 2, including lysine acetylation when required. The derivative peptides assayed provided, as well, the same activity against the influenza virus reported in this example 2.1.

Example 2.2.: In Vitro Assays of Dermcidin Activity Against Whole Live Influenza Virus Protocol was identical to that of example 2.1 but the HAI assays were performed against live virus from subtype H1N1 (FIG. 4A) and subtype H3N2 (FIG. 4B) of influenza virus, at a standardised concentration of 4 HAU/25 μl in 1.5% v/v turkey red blood cells (RBC) which is equivalent to $1.2\times10^8$ cells/ml in phosphate buffered saline solution (PBS)

In both FIGS. 4A and 4B, each row included a different peptide, including the different dermcidin lysine-acetylated derived fragments synthesized: peptide of sequence SEQ ID No. 23 (row A), peptide of sequence SEQ ID No.: 22 (row B), peptide of sequence SEQ ID No.: 20 (row C), peptide of sequence SEQ ID No.: 19 (row D), peptide of sequence SEQ ID No.: 21 (row E). columns 1 to 10 include different dilutions of the corresponding peptide: 2 mg/ml (column 1), 1 mg/ml (column 2), 0.5 mg/ml (column 3), 0.25 mg/ml (column 4), 0.125 mg/ml (column 5), 0.06 mg/ml (column 6), 0.03 mg/ml (column 7), 0.015 mg/ml (column 8), 8 μg/ml (column 9) and 4 μg/ml (column 10).

Columns 11 and 12 included control assays including only the corresponding peptide at a concentration of 2 mg/ml and RBC. Wells F1 and F2 contained a control with live influenza viruses from subtypes H1N1 (FIG. 4A) and subtype H3N2 (FIG. 4B) of influenza virus, standardised at a concentration 4 HAU/25 μl and RBC. On the other hand, wells F3 and F4 were controls containing only RBC.

As seen in FIGS. 4A and 4B, peptides of SEQ ID Nos: 20, 22 and 23 had activity against the H1N1 subtype of live influenza virus, whereas peptides of SEQ ID Nos.: 20, 21, 22 and 23 had activity against the H3N2 subtype of live influenza virus.

Example 3: In Vitro Assays of Dermcidin Activity Against Other Respiratory Viruses After demonstrating the activity of dermcidin and its lysine-acetylated derivates against two different subtypes of influenza virus, the objective of the example 3 is evaluating if dermcidin is active against other respiratory viruses. In this case, we have evaluated the efficacy against human coronavirus HcoV-OC43 causative of common cold, human coronavirus SARS-CoV-2 causative of COVID-19 and against measles virus. Particularly, we tested if the peptides of sequences SEC ID No.: 23 and SEQ ID No.: 22 were capable of inhibiting the agglutination caused by these viruses and thereof they would be able to block the first step of virus infection. The three viruses tested are viral lysates, heat-inactivated (treatment at 56° C. for 30 minutes) and standardized at a concentration of 4UHA/25 μl. The HAI assay was performed following the same protocol as the example 2 but adapted for the new viruses tested. For this, the assay was performed using 1.5% v/v of turkey red blood cells (RBC). RBCs are known to express different receptors used by viruses to adhere to host cells, including sialic acid used for binding of haemagglutinin from influenza, Angiotensin-converting enzyme 2 (ACE2) used for binding of spike proteins from coronaviruses, or basigin (CD147) that facilitates binding of coronaviruses.

In this assay (FIG. 5), the efficacy of two peptides of the invention SEQ ID No.: 23 and SEQ ID No.: 22 to inhibit agglutination of human coronavirus HcoV-OC43 in rows A and B, human coronavirus SARS-CoV-2 in rows C and D and measles virus in rows E and F were evaluated. All viruses were lysated, heat-inactivated and standardized at a concentration of 4 UHA/25 μl. Rows A, C and E contain serial dilutions of peptide SEQ ID No.: 23 and rows B, D and F contain serial dilutions of peptide SEQ D No.: 22. Columns 1 to 10 include different dilutions of the corresponding peptide: 2 mg/ml (column 1), 1 mg/ml (column 2), 0.5 mg/ml (column 3), 0.25 mg/ml (column 4), 0.125 mg/ml (column 5), 0.06 mg/ml (column 6), 0.03 mg/ml (column 7), 0.015 mg/ml (column 8), 8 μg/ml (column 9) and 4 μg/ml (column 10). Columns 11 and 12 include the following controls: wells A11 and A12 contain the peptide SEQ ID. No.: 23 at 2 mg/ml and RBC; wells B11 and B12 contain the peptide SEQ ID No.: 22 at 2 mg/ml and RBC; wells C11 and C12 contain viral lysate of HcoV-OC43 and RBC; wells D11 and D12 contain viral lysate of SARS-CoV-2 and RBC; wells E11 and E12 contain viral lysate of measles virus and RBC; and wells F11 and F12 correspond to controls with PBS and RBC.

Figure 5:
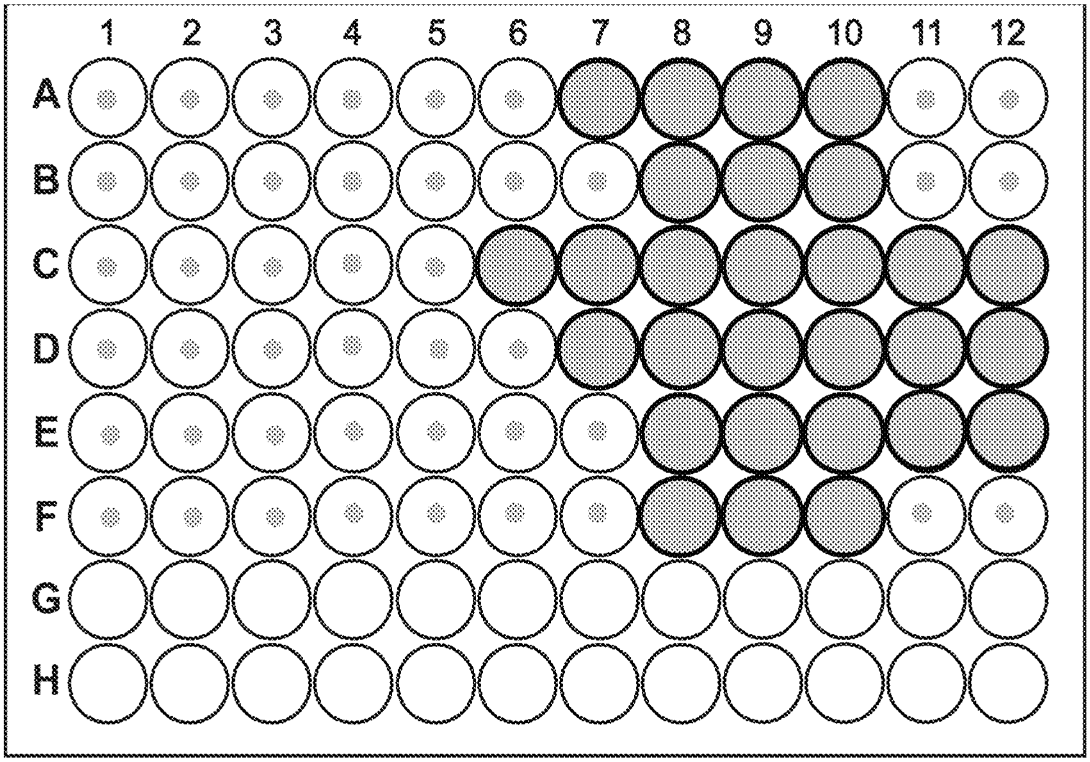
FIG. 5: Schematic representation of a HAI with other respiratory viruses. All wells contain 1.5% v/v turkey red blood cells (RBC), which is equivalent to $1.2\times10^7$ cells/ml in phosphate buffered saline (PBS). Rows A and B contain human coronavirus HcoV-OC43 causative of common cold; rows C and D contain human coronavirus SARS-CoV-2 causative of COVID-19 and rows E and F contain measles virus. All viruses were lysated, heat-inactivated and standardised at a concentration of 4 UHA/25 µl. Rows A, C and E contain serial dilutions of peptide SEQ ID No.: 23 and rows B, D and F contain serial dilutions of peptide SEQ D No.: 22. Columns 1 to 10 include different dilutions of the corresponding peptide: 2 mg/ml (column 1), 1 mg/ml (column 2), 0.5 mg/ml (column 3), 0.25 mg/ml (column 4), 0.125 mg/ml (column 5), 0.06 mg/ml (column 6), 0.03 mg/ml (column 7), 0.015 mg/ml (column 8), 8 µg/ml (column 9) y 4 µg/ml (column 10). Columns 11 and 12 contain the following controls: wells A11 and A12 contain the peptide SEQ ID No.: 23 at 2 mg/ml and RBC; wells B11 and B12 contain the peptide SEQ ID No.: 22 at 2 mg/ml and RBC; wells C11 and C12 contain the viral lysate of HcoV-OC43 and RBC; wells D11 y D12 contain the viral lysate of SARS-CoV-2 and RBC; wells E11 y E12 contain the viral lysate of measles virus and RBC; and lastly wells F11 and F12 correspond to controls containing RBC and PBS.

As can be seen in FIG. 5, the peptide SEQ ID No.: 23 and peptide SEQ ID No.: 22 are active against the two human coronaviruses tested (HcoV-OC43 and SARS-CoV-2) and against measles virus, by preventing adhesion of the viruses to RBCs.

Example 4: Method for the In Vitro Quantification of Dermcidin Content in Saliva Samples The protocol recommended in the Human Proteolysis Inducing Factor/Dermcidin (PIF/DCD) ELISA Kit (catalogue number: CSB-E13626h) of CUSABIO BIOTECH CO., LTD, was modified to detect dermcidin in human saliva samples. The original kit used determines the concentration of dermcidin and human proteolysis-inducing factor (PIF) in plasma, serum, cell culture supernatants, urine and tissue homogenates, but not in saliva. Based on this kit, a method has been developed using the above-mentioned kit which allowed the quantification of dermcidin also in saliva samples.

The method and kit of the invention uses a sandwich assay employing antibodies that coat the test wells specific for any of peptides of SEQ ID Nos.: 1 to 17, i.e. specific for dermcidin (SEQ ID No. 17) or any fragment thereof (SEQ ID Nos.: 1 to 16) as disclosed in table 1.

The pre-processing of human saliva samples for dermcidin detection (including any fragment thereof) is as follows: unstimulated saliva samples, stored at −80° C. since collection, must be thawed at 4° C. overnight to prevent the proteins from being denatured by sudden temperature changes. Subsequently, modifying the kit recommendations, the samples were centrifuged at 1000×g for 20 minutes at 4° C., to keep the samples cold and to remove any cellular and food debris they may contain, and the supernatants were kept for the next steps.

The saliva samples were diluted 1:4 to 1:8 with the kit's sample diluent (as opposed to the 1:500 dilution recommended in the commercial kit), and the incubation time of the sample with the substrate was modified to between 5 and 15 minutes (as opposed to the 15 to 30 minutes recommended in the commercial kit).

To validate the results of this method, both chemically synthesised dermcidin fragments of SEQ ID No.: 5 (DCD-1L) and of SEQ ID No.: 16 (PIF) at a known concentration (6 ng/ml) and an equimolar mixture of both were used to demonstrate that the detected values correspond to the initial values placed in the well. Table 3 shows the results of this test, demonstrating that, under the optimised conditions, the kit measures the concentrations of dermcidin or any of its fragments (as PIF or DCD-1L) appropriately:

TABLE 3

Absorbance values and real concentrations of the chemically synthesised peptides and those calculated by the kit. The differences between the real concentration and the calculated concentration are not significant (p-value = 0.75), so the value obtained by the designed detection method reproduces the real concentration of any of the fragments of dermcidin included in the sample.

| | Stock solution concentration (ng/ml) | OD1 | OD2 | Mean | Corrected | Calculated concentration (ng/ml) |
|---|---|---|---|---|---|---|
| DCD-1L (SEQ ID No.: 5) | 6 | 0.2196 | 0.2395 | 0.2295 | 0.2084 | 7.85 |
| PIF (SEQ ID No.: 16) | 6 | 0.1673 | 0.1283 | 0.1478 | 0.1266 | 5.05 |
| DCD-1L + PIF(*) (SEQ ID Nos.: 5 and 16) | 6 | 0.1663 | 0.1884 | 0.1773 | 0.1562 | 6.09 |

(*)The concentration indicated is that of the stock solution of each peptide mixed at equal volume to deliver a final concentration of (3 ng of SEQ ID No: 5 + 3 ng of SEQ ID No.: 16)/ml, i.e. a total peptide concentration of 6 ng/ml.

Dermcidin (measured as the total concentration of all the peptides of SEQ ID No.: 17, and of any of its fragments of SEQ ID Nos.: 1 to 16) has thus been shown to be detectable in human saliva samples.

Furthermore, the method developed qualitatively and quantitatively detects the total concentration of dermcidin peptides of SEQ ID Nos.: 1 to 17 in a saliva sample and has the advantage of using a sample that is painless, non-invasive and easily obtained.

Figure 6:
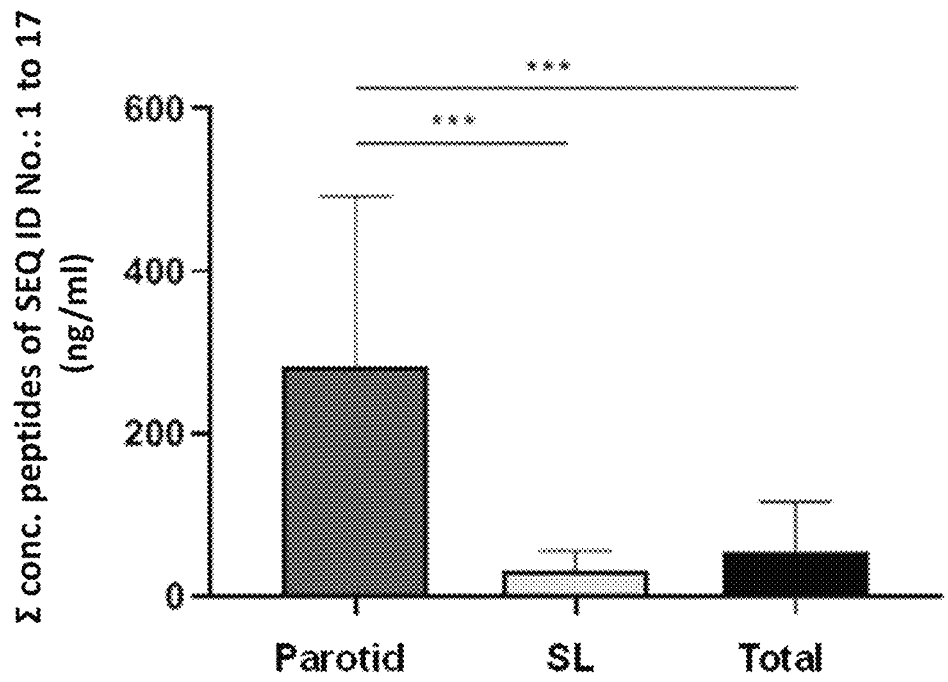
FIG. 6. Total concentration of peptides with sequences SEQ ID No.: 17 or a fragment thereof (SEQ ID Nos.: 1 to 16) in ng/ml in saliva samples from the parotid gland ("Parotid"), sublingual and submandibular gland ("SL") and unstimulated total saliva ("Total") of 11 healthy individuals. The difference in concentration secreted by the parotid gland ("Parotid") compared to the rest is statistically significant (p-value=0.001). Measurements were taken by immunoassay test (ELISA), according to the method of example 4.

With this method there were also assessed the total concentration of dermcidin and of any fragment thereof, i.e. a peptide of SEQ ID Nos.: 1 to 17 in saliva samples from the parotid gland, sublingual and submandibular glands, as well as in unstimulated total saliva from 11 healthy individuals. As shown in FIG. 6, the data show that dermcidin is mainly secreted in the parotid gland. Therefore, patients with compromised parotid gland function (e.g. patients with Sjogren's syndrome or treated by radiotherapy for head-neck cancer, among others) may have decreased dermcidin production, with possible consequences for susceptibility to infection by a virus affecting the respiratory tract.

Example 5: In Vitro Method for Determination of Resistance to a Virus Affecting the Respiratory Tract in an Individual The dermcidin detection method in saliva developed in example 4 was used to develop a method for in vitro detection of an individual's resistance to infection by a virus affecting the respiratory tract, for example and in particular, the influenza virus.

Saliva samples were collected from two groups of individuals: (1) susceptible individuals recontacted 6 months after having been admitted for influenza virus-positive respiratory tract pathology; and (2) individuals who had never experienced symptoms of the disease and had never been vaccinated. Prior to sample collection, the collection, use and evaluation of the samples were satisfactorily evaluated by the Ethics Committee of FISABIO-DGSP.

Figure 7:
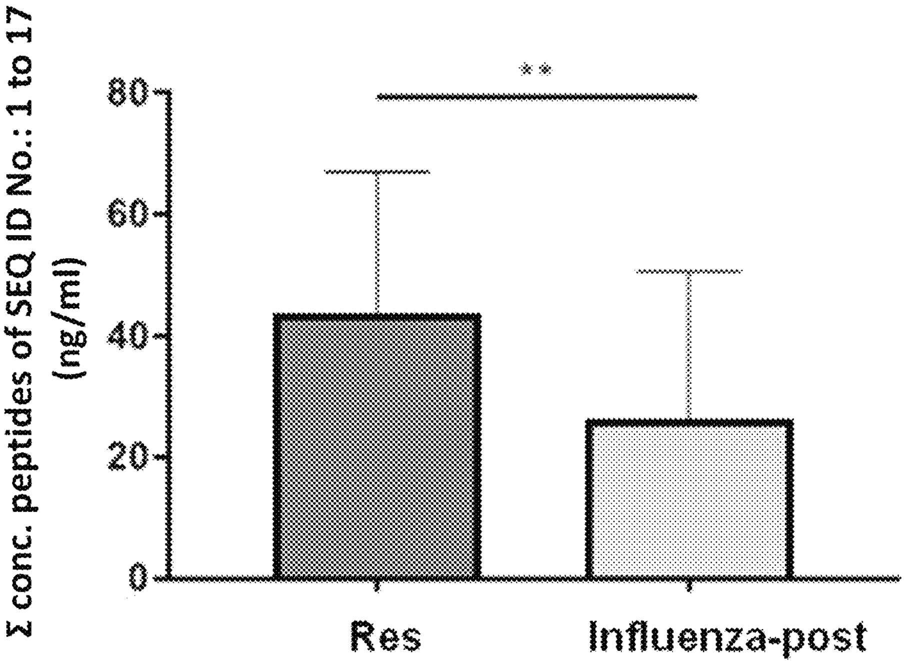
FIG. 7. Mean and Standard Error of total concentration measurements of peptides with sequence SEQ ID No.: 17 or a fragment thereof (SEQ ID Nos.: 1 to 16), expressed in ng/ml in saliva samples from individuals resistant to influenza virus infection (Res, n=36) and from individuals admitted for respiratory tract pathology and positive for influenza virus by PCR test, 6 months after infection (Influenza-post, n=17), p-value=0.0044. Measurements were performed by immunoassay test (ELISA), according to the method in example 4.

FIG. 7 shows the results of the means and standard errors of the concentration of any of peptides of SEQ ID Nos.: 1 to 17, i.e. dermcidin (SEQ ID No. 17) or any fragment thereof (SEQ ID Nos.: 1 to 16) as disclosed in table 1, in saliva (ng/ml), using the method of example 4, of individuals belonging to two population groups (resistant to influenza virus infection (Res, n=36) and susceptible individuals recontacted 6 months after having been admitted for influenza virus-positive respiratory tract pathology (Influenza-post, n=17)).

On the other hand, the level of dermcidin peptides was measured by ELISA test as described in example 4 above, in saliva samples from people, at the time of admission to hospital for influenza and, the same people 6 months after symptoms (n=20). The data, as shown in FIG. 8, the dermcidin, and dermcidin fragments, production is significantly higher in people infected with the influenza virus during influenza infection compared to their baseline levels in the absence of infection. Thus, FIG. 8A shows the total concentration of peptides of SEQ ID Nos.: 1 to 17, in ng/ml, in saliva samples from the group of individuals with influenza, at the time of hospital admission (Influenza) and, the same individuals 6 months after having suffered the symptoms of the disease (Influenza-post, n=20), measured by the method of the invention, according to example 4. On the other hand, FIG. 8B shows the total concentration of peptides of SEQ ID Nos.: 1 to 17, in ng/μg of total salivary protein for the same groups. Table 4 below shows the statistical significance values obtained for the data in FIGS. 7, 8A and 8B with the Mann-Whitney test:

TABLE 4

Statistical significance values for FIGS. 7, 8A and 8B

| Group | Test | n1 | n2 | p-value | Significance |
|---|---|---|---|---|---|
| Influenza-resistant individuals versus susceptible individuals after 6 months of illness (FIG. 7). | Mann-Whitney | 36 | 17 | 0.0044 | * |
| Influenza-sensitive individuals—during illness and after 6 months (FIG. 8A) total concentration (ng/ml) of peptides of SEQ ID Nos.: 1 to 17 per ml of saliva. | Mann-Whitney | 20 | 20 | 0.0032 | *** |
| Influenza-sensitive individuals—during illness and after 6 months (FIG. 8B) total concentration of peptides of SEQ ID Nos.: 1 to 17 (ng/μg total salivary protein) | Mann-Whitney | 20 | 20 | 0.012 | ** |

This demonstrates that peptide production is stimulated in response to influenza infection. Finally, the same ELISA test described above in example 4 was used to assess whether the total concentration of dermcidin peptides (all of peptides of SEQ ID Nos.: 1 to 17) in saliva varies throughout the day. Unstimulated saliva samples were taken from 4 volunteers at 9, 12, 15, 15, 18 and 21 hours, at least half an hour after ingestion of food. As shown in FIG. 9, the data show that the total levels of dermcidin peptides (all peptide of SEQ ID Nos.: 1 to 17) do not vary significantly throughout the day. This suggests that the concentration of dermcidin, or a fragment thereof, in saliva is not dependent on the circadian rhythm, so the time of sampling would not influence their determination. This facilitates the use of the method of the invention, as measurements could be taken in the morning or in the evening, conforming to the schedules of clinics or health centres.

Example 6: Cytotoxicity Test

The cytotoxicity of the peptides described in present invention, which exhibit antiviral activity, was tested by in vitro cytotoxicity assays on the eukaryotic MDCK cell model. Four peptides with activity against influenza virus were chemically synthesised:

DCD-1L (SEQ ID No.: 5) of 48 aminoacids

SSL-45 (SEQ ID No.: 3) of 45 aminoacids

LEK-45 (SEQ ID No.: 2) of 45 aminoacids

EB of 20 aminoacids used as control

To perform the cytotoxicity assay, MDCK cells were cultured in multiwell plates at a density of $1.5\times10^5$ cells/ml and serial dilutions of all peptides to be tested were made. The cells were incubated with the peptides for 20 hours at 37° C. 5% $CO_2$. After this time, 20 μl of MTS reagent (3-(4,5-dimethylthiazol-2-yl)-5-(3-carboxymethoxyphenyl)-2-(4-sulfophenyl)-2H-tetrazolium) was added per well. This compound is reduced to a formazan derived product by viable, metabolically active cells. This formazan derived product is detected by measuring the absorbance at 490 nm by a plate reader after 2 hours of incubation. This was carried out under sterile conditions to avoid contamination. The absorbance measurements were transformed to percentage cell viability taking as 100% viability the absorbance measurements of the controls (cells incubated only with buffer and MTS compound).

Figure 10:
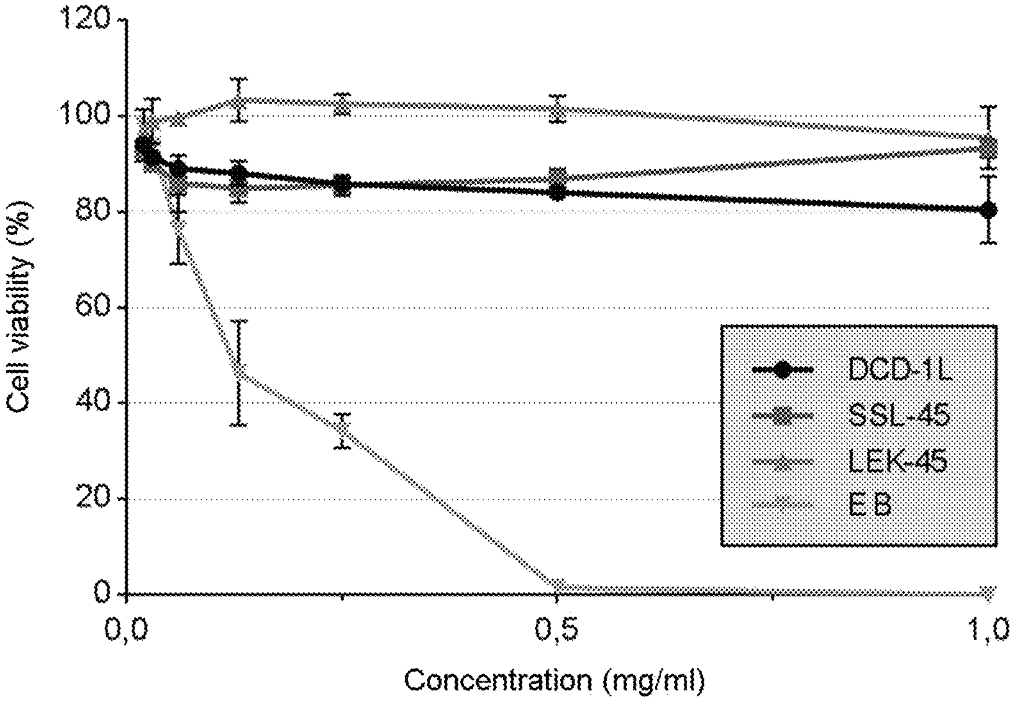
FIG. 10. Cytotoxicity analysis by MTS (3-(4,5-dimethylthiazol-2-yl)-5-(3-carboxymethoxyphenyl)-2-(4-sulfophenyl)-2H-tetrazolium) assay of the peptides of the invention. The percentage cell viability (Y-axis) after 20 hours of contact with the corresponding peptide is shown against the concentration of the peptides with SEQ ID No.: 2, SEQ ID No.: 3, SEQ ID No.: 5 and against the EB peptide as a positive control for haemagglutination inhibition, in mg/ml (X-axis). Mean and Standard Error of the percentage of cell viability of each of the peptides tested at different concentrations in two replicates.

FIG. 10 shows the results of the means and standard error of the percentages of cell viability for each of the peptide concentrations tested. It can be seen that none of the three peptides of interest tested, SEQ ID No.: 5 (DCD1-L), SEQ ID No.: 3 (SSL-45) and SEQ ID No.: 2 (LEK-45) cause significant toxicity in cells. Even at the highest concentration tested in this experiment (1 mg/ml), only 20% of the cells in the culture exhibited toxicity. Whereas the peptide used as a control (EB), at a concentration almost ten times lower (0.125 mg/ml) produces 50% cytotoxicity of the cells in the culture, and at 0.5 mg/ml of the EB peptide, total cell destruction is observed. The results demonstrate that dermcidin fragments with activity against the influenza virus do not have significant cytotoxic effects at effective concentrations. This opens the way for further peptide effectiveness testing.

The invention claimed is:

1. A method of preventing and/or treating a disease caused by a virus affecting the respiratory tract, said method comprising administering an effective amount of a peptide or administering a pharmaceutical composition comprising an effective amount of said peptide and at least one pharmaceutically acceptable excipient or carrier, to a subject in need thereof, wherein said peptide comprises a sequence selected from the group consisting of: SEQ ID NO: 1, SEQ ID NO: 2, SEQ ID NO: 3, SEQ ID NO: 4, SEQ ID NO: 5, SEQ ID NO: 19, SEQ ID NO: 20, SEQ ID NO: 21, SEQ ID NO: 22, and SEQ ID NO: 23, wherein the virus affecting the respiratory tract is selected from the group consisting of: an influenza virus, a coronavirus, a syncytial virus (RSV), a rhinovirus (RVs), a parainfluenza virus (PIV), an adenovirus (ADV), a morbillivirus, and an enterovirus.

2. The method according to claim 1, wherein said peptide consists of a sequence selected from the group consisting of SEQ ID NO: 1, SEQ ID NO: 2, SEQ ID NO: 3, SEQ ID NO: 4, SEQ ID NO: 5, SEQ ID NO: 19, SEQ ID NO: 20, SEQ ID NO: 21, SEQ ID NO: 22 and SEQ ID NO: 23.

3. The method according to claim 2, wherein said peptide consists of a sequence selected from the group consisting of SEQ ID NO: 4, SEQ ID NO: 5, SEQ ID NO: 22 and SEQ ID NO: 23.

4. The method according to claim 3, wherein said peptide consists of a sequence selected from SEQ ID NO: 4 or SEQ ID NO: 22.

5. The method according to claim 3, wherein said peptide consists of a sequence selected from SEQ ID NO: 5 or SEQ ID NO: 23.

6. The method according to claim 1, wherein the virus affecting the respiratory tract is an influenza virus.

7. The method according to claim 6, wherein said influenza virus is a subtype H3N2 influenza virus.

8. The method according to claim 6, wherein said influenza virus is a subtype H1N1 influenza virus.

9. The method according to claim 1, wherein the virus affecting the respiratory tract is a coronavirus.

10. The method according to claim 9, wherein the coronavirus is HCoV-OC43 or SARS-CoV-2.

11. The method according to claim 1, wherein the virus affecting the respiratory tract is a morbillivirus.

* * * * *

SEQUENCE LISTING

```
<160> NUMBER OF SEQ ID NOS: 32

<210> SEQ ID NO 1
<211> LENGTH: 42
<212> TYPE: PRT
<213> ORGANISM: Artificial Sequence
<220> FEATURE:
<223> OTHER INFORMATION: LEK-42

<400> SEQUENCE: 1

Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu Asp
        35                  40


<210> SEQ ID NO 2
<211> LENGTH: 45
<212> TYPE: PRT
<213> ORGANISM: Artificial Sequence
<220> FEATURE:
<223> OTHER INFORMATION: LEK-45

<400> SEQUENCE: 2

Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu Asp Ser Val Leu
        35                  40                  45


<210> SEQ ID NO 3
<211> LENGTH: 45
<212> TYPE: PRT
<213> ORGANISM: Artificial Sequence
<220> FEATURE:
<223> OTHER INFORMATION: SSL-45

<400> SEQUENCE: 3

Ser Ser Leu Leu Glu Lys Gly Leu Asp Gly Ala Lys Lys Ala Val Gly
1               5                   10                  15

Gly Leu Gly Lys Leu Gly Lys Asp Ala Val Glu Asp Leu Glu Ser Val
            20                  25                  30

Gly Lys Gly Ala Val His Asp Val Lys Asp Val Leu Asp
        35                  40                  45


<210> SEQ ID NO 4
<211> LENGTH: 47
<212> TYPE: PRT
<213> ORGANISM: Artificial Sequence
<220> FEATURE:
<223> OTHER INFORMATION: DCD

<400> SEQUENCE: 4

Ser Ser Leu Leu Glu Lys Gly Leu Asp Gly Ala Lys Lys Ala Val Gly
1               5                   10                  15

Gly Leu Gly Lys Leu Gly Lys Asp Ala Val Glu Asp Leu Glu Ser Val
            20                  25                  30

Gly Lys Gly Ala Val His Asp Val Lys Asp Val Leu Asp Ser Val
        35                  40                  45
```

<210> SEQ ID NO 5
<211> LENGTH: 48
<212> TYPE: PRT
<213> ORGANISM: Artificial Sequence
<220> FEATURE:
<223> OTHER INFORMATION: DCD-1L

<400> SEQUENCE: 5

```
Ser Ser Leu Leu Glu Lys Gly Leu Asp Gly Ala Lys Lys Ala Val Gly
1               5                   10                  15

Gly Leu Gly Lys Leu Gly Lys Asp Ala Val Glu Asp Leu Glu Ser Val
            20                  25                  30

Gly Lys Gly Ala Val His Asp Val Lys Asp Val Leu Asp Ser Val Leu
        35                  40                  45
```

<210> SEQ ID NO 6
<211> LENGTH: 46
<212> TYPE: PRT
<213> ORGANISM: Artificial Sequence
<220> FEATURE:
<223> OTHER INFORMATION: SSL-46

<400> SEQUENCE: 6

```
Ser Ser Leu Leu Glu Lys Gly Leu Asp Gly Ala Lys Lys Ala Val Gly
1               5                   10                  15

Gly Leu Gly Lys Leu Gly Lys Asp Ala Val Glu Asp Leu Glu Ser Val
            20                  25                  30

Gly Lys Gly Ala Val His Asp Val Lys Asp Val Leu Asp Ser
        35                  40                  45
```

<210> SEQ ID NO 7
<211> LENGTH: 44
<212> TYPE: PRT
<213> ORGANISM: Artificial Sequence
<220> FEATURE:
<223> OTHER INFORMATION: LEK-44

<400> SEQUENCE: 7

```
Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu Asp Ser Val
        35                  40
```

<210> SEQ ID NO 8
<211> LENGTH: 43
<212> TYPE: PRT
<213> ORGANISM: Artificial Sequence
<220> FEATURE:
<223> OTHER INFORMATION: LEK-43

<400> SEQUENCE: 8

```
Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu Asp Ser
        35                  40
```

<210> SEQ ID NO 9
<211> LENGTH: 28
<212> TYPE: PRT

<213> ORGANISM: Artificial Sequence
<220> FEATURE:
<223> OTHER INFORMATION: SSL-29

<400> SEQUENCE: 9

```
Ser Ser Leu Leu Glu Lys Gly Leu Gly Ala Lys Lys Ala Val Gly Gly
1               5                   10                  15

Leu Gly Lys Leu Gly Lys Asp Ala Val Glu Asp Leu
            20                  25
```

<210> SEQ ID NO 10
<211> LENGTH: 25
<212> TYPE: PRT
<213> ORGANISM: Artificial Sequence
<220> FEATURE:
<223> OTHER INFORMATION: SSL-25

<400> SEQUENCE: 10

```
Ser Ser Leu Leu Glu Lys Gly Leu Asp Gly Ala Lys Lys Ala Val Gly
1               5                   10                  15

Gly Leu Gly Lys Leu Gly Lys Asp Ala
            20                  25
```

<210> SEQ ID NO 11
<211> LENGTH: 41
<212> TYPE: PRT
<213> ORGANISM: Artificial Sequence
<220> FEATURE:
<223> OTHER INFORMATION: LEK-41

<400> SEQUENCE: 11

```
Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu
        35                  40
```

<210> SEQ ID NO 12
<211> LENGTH: 26
<212> TYPE: PRT
<213> ORGANISM: Artificial Sequence
<220> FEATURE:
<223> OTHER INFORMATION: LEK-26

<400> SEQUENCE: 12

```
Leu Glu Lys Gly Leu Asp Gly Ala Lys Lys Ala Val Gly Gly Leu Gly
1               5                   10                  15

Lys Leu Gly Lys Asp Ala Val Glu Asp Leu
            20                  25
```

<210> SEQ ID NO 13
<211> LENGTH: 24
<212> TYPE: PRT
<213> ORGANISM: Artificial Sequence
<220> FEATURE:
<223> OTHER INFORMATION: LEK-24

<400> SEQUENCE: 13

```
Leu Glu Lys Gly Leu Asp Gly Ala Lys Lys Ala Val Gly Gly Leu Gly
1               5                   10                  15

Lys Leu Gly Lys Asp Ala Val Glu
            20
```

<210> SEQ ID NO 14
<211> LENGTH: 42
<212> TYPE: PRT
<213> ORGANISM: Artificial Sequence
<220> FEATURE:
<223> OTHER INFORMATION: YDP-42

<400> SEQUENCE: 14

```
Tyr Asp Pro Glu Ala Ala Ser Ala Pro Gly Ser Gly Asn Pro Cys His
1               5                   10                  15

Glu Ala Ser Ala Ala Gln Lys Glu Asn Ala Gly Glu Asp Pro Gly Leu
            20                  25                  30

Ala Arg Gln Ala Pro Lys Pro Arg Lys Gln
        35                  40
```

<210> SEQ ID NO 15
<211> LENGTH: 30
<212> TYPE: PRT
<213> ORGANISM: Artificial Sequence
<220> FEATURE:
<223> OTHER INFORMATION: Y-P30

<400> SEQUENCE: 15

```
Tyr Asp Pro Glu Ala Ala Ser Ala Pro Gly Ser Gly Asn Pro Cys His
1               5                   10                  15

Glu Ala Ser Ala Ala Gln Lys Glu Asn Ala Gly Glu Asp Pro
            20                  25                  30
```

<210> SEQ ID NO 16
<211> LENGTH: 20
<212> TYPE: PRT
<213> ORGANISM: Artificial Sequence
<220> FEATURE:
<223> OTHER INFORMATION: PIF

<400> SEQUENCE: 16

```
Tyr Asp Pro Glu Ala Ala Ser Ala Pro Gly Ser Gly Asn Pro Cys His
1               5                   10                  15

Glu Ala Ser Ala
            20
```

<210> SEQ ID NO 17
<211> LENGTH: 110
<212> TYPE: PRT
<213> ORGANISM: Artificial Sequence
<220> FEATURE:
<223> OTHER INFORMATION: Dermcidin

<400> SEQUENCE: 17

```
Met Arg Phe Met Thr Leu Leu Phe Leu Thr Ala Leu Ala Gly Ala Leu
1               5                   10                  15

Val Cys Ala Tyr Asp Pro Glu Ala Ala Ser Ala Pro Gly Ser Gly Asn
            20                  25                  30

Pro Cys His Glu Ala Ser Ala Ala Gln Lys Glu Asn Ala Gly Glu Asp
        35                  40                  45

Pro Gly Leu Ala Arg Gln Ala Pro Lys Pro Arg Lys Gln Arg Ser Ser
    50                  55                  60

Leu Leu Glu Lys Gly Leu Asp Gly Ala Lys Lys Ala Val Gly Gly Leu
65                  70                  75                  80

Gly Lys Leu Gly Lys Asp Ala Val Glu Asp Leu Glu Ser Val Gly Lys
                85                  90                  95
```

```
Gly Ala Val His Asp Val Lys Asp Val Leu Asp Ser Val Leu
            100                 105                 110


<210> SEQ ID NO 18
<211> LENGTH: 20
<212> TYPE: PRT
<213> ORGANISM: Artificial Sequence
<220> FEATURE:
<223> OTHER INFORMATION: EB_FGF-4 signal peptide

<400> SEQUENCE: 18

Arg Arg Lys Lys Ala Ala Val Ala Leu Leu Pro Ala Val Leu Leu Ala
1               5                   10                  15

Leu Leu Ala Pro
            20


<210> SEQ ID NO 19
<211> LENGTH: 42
<212> TYPE: PRT
<213> ORGANISM: Artificial Sequence
<220> FEATURE:
<223> OTHER INFORMATION: LEK-42
<220> FEATURE:
<221> NAME/KEY: MOD_RES
<222> LOCATION: (3)..(3)
<223> OTHER INFORMATION: ACETYLATION

<400> SEQUENCE: 19

Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu Asp
        35                  40


<210> SEQ ID NO 20
<211> LENGTH: 45
<212> TYPE: PRT
<213> ORGANISM: Artificial Sequence
<220> FEATURE:
<223> OTHER INFORMATION: LEK-45
<220> FEATURE:
<221> NAME/KEY: MOD_RES
<222> LOCATION: (3)..(3)
<223> OTHER INFORMATION: ACETYLATION

<400> SEQUENCE: 20

Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu Asp Ser Val Leu
        35                  40                  45


<210> SEQ ID NO 21
<211> LENGTH: 45
<212> TYPE: PRT
<213> ORGANISM: Artificial Sequence
<220> FEATURE:
<223> OTHER INFORMATION: SSL-45
<220> FEATURE:
<221> NAME/KEY: MOD_RES
<222> LOCATION: (6)..(6)
<223> OTHER INFORMATION: ACETYLATION

<400> SEQUENCE: 21
```

Ser Ser Leu Leu Glu Lys Gly Leu Asp Gly Ala Lys Lys Ala Val Gly
1 5 10 15

Gly Leu Gly Lys Leu Gly Lys Asp Ala Val Glu Asp Leu Glu Ser Val
20 25 30

Gly Lys Gly Ala Val His Asp Val Lys Asp Val Leu Asp
35 40 45

<210> SEQ ID NO 22
<211> LENGTH: 47
<212> TYPE: PRT
<213> ORGANISM: Artificial Sequence
<220> FEATURE:
<223> OTHER INFORMATION: DCD
<220> FEATURE:
<221> NAME/KEY: MOD_RES
<222> LOCATION: (6)..(6)
<223> OTHER INFORMATION: ACETYLATION

<400> SEQUENCE: 22

Ser Ser Leu Leu Glu Lys Gly Leu Asp Gly Ala Lys Lys Ala Val Gly
1 5 10 15

Gly Leu Gly Lys Leu Gly Lys Asp Ala Val Glu Asp Leu Glu Ser Val
20 25 30

Gly Lys Gly Ala Val His Asp Val Lys Asp Val Leu Asp Ser Val
35 40 45

<210> SEQ ID NO 23
<211> LENGTH: 48
<212> TYPE: PRT
<213> ORGANISM: Artificial Sequence
<220> FEATURE:
<223> OTHER INFORMATION: DCD-1L
<220> FEATURE:
<221> NAME/KEY: MOD_RES
<222> LOCATION: (6)..(6)
<223> OTHER INFORMATION: ACETYLATION

<400> SEQUENCE: 23

Ser Ser Leu Leu Glu Lys Gly Leu Asp Gly Ala Lys Lys Ala Val Gly
1 5 10 15

Gly Leu Gly Lys Leu Gly Lys Asp Ala Val Glu Asp Leu Glu Ser Val
20 25 30

Gly Lys Gly Ala Val His Asp Val Lys Asp Val Leu Asp Ser Val Leu
35 40 45

<210> SEQ ID NO 24
<211> LENGTH: 46
<212> TYPE: PRT
<213> ORGANISM: Artificial Sequence
<220> FEATURE:
<223> OTHER INFORMATION: SSL-46
<220> FEATURE:
<221> NAME/KEY: MOD_RES
<222> LOCATION: (6)..(6)
<223> OTHER INFORMATION: ACETYLATION

<400> SEQUENCE: 24

Ser Ser Leu Leu Glu Lys Gly Leu Asp Gly Ala Lys Lys Ala Val Gly
1 5 10 15

Gly Leu Gly Lys Leu Gly Lys Asp Ala Val Glu Asp Leu Glu Ser Val
20 25 30

Gly Lys Gly Ala Val His Asp Val Lys Asp Val Leu Asp Ser
35 40 45

<210> SEQ ID NO 25
<211> LENGTH: 44
<212> TYPE: PRT
<213> ORGANISM: Artificial Sequence
<220> FEATURE:
<223> OTHER INFORMATION: LEK-44
<220> FEATURE:
<221> NAME/KEY: MOD_RES
<222> LOCATION: (3)..(3)
<223> OTHER INFORMATION: ACETYLATION

<400> SEQUENCE: 25

Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu Asp Ser Val
        35                  40

<210> SEQ ID NO 26
<211> LENGTH: 43
<212> TYPE: PRT
<213> ORGANISM: Artificial Sequence
<220> FEATURE:
<223> OTHER INFORMATION: LEK-43
<220> FEATURE:
<221> NAME/KEY: MOD_RES
<222> LOCATION: (3)..(3)
<223> OTHER INFORMATION: ACETYLATION

<400> SEQUENCE: 26

Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu Asp Ser
        35                  40

<210> SEQ ID NO 27
<211> LENGTH: 28
<212> TYPE: PRT
<213> ORGANISM: Artificial Sequence
<220> FEATURE:
<223> OTHER INFORMATION: SSL-29
<220> FEATURE:
<221> NAME/KEY: MOD_RES
<222> LOCATION: (6)..(6)
<223> OTHER INFORMATION: ACETYLATION

<400> SEQUENCE: 27

Ser Ser Leu Leu Glu Lys Gly Leu Gly Ala Lys Lys Ala Val Gly Gly
1               5                   10                  15

Leu Gly Lys Leu Gly Lys Asp Ala Val Glu Asp Leu
            20                  25

<210> SEQ ID NO 28
<211> LENGTH: 25
<212> TYPE: PRT
<213> ORGANISM: Artificial Sequence
<220> FEATURE:
<223> OTHER INFORMATION: SSL-25
<220> FEATURE:
<221> NAME/KEY: MOD_RES
<222> LOCATION: (6)..(6)
<223> OTHER INFORMATION: ACETYLATION

<400> SEQUENCE: 28

```
Ser Ser Leu Leu Glu Lys Gly Leu Asp Gly Ala Lys Lys Ala Val Gly
1               5                   10                  15

Gly Leu Gly Lys Leu Gly Lys Asp Ala
            20                  25


<210> SEQ ID NO 29
<211> LENGTH: 41
<212> TYPE: PRT
<213> ORGANISM: Artificial Sequence
<220> FEATURE:
<223> OTHER INFORMATION: LEK-41
<220> FEATURE:
<221> NAME/KEY: MOD_RES
<222> LOCATION: (3)..(3)
<223> OTHER INFORMATION: ACETYLATION

<400> SEQUENCE: 29

Leu Glu Lys Gly Leu Asp Gly Ala Lys Lys Ala Val Gly Gly Leu Gly
1               5                   10                  15

Lys Leu Gly Lys Asp Ala Val Glu Asp Leu Glu Ser Val Gly Lys Gly
            20                  25                  30

Ala Val His Asp Val Lys Asp Val Leu
        35                  40


<210> SEQ ID NO 30
<211> LENGTH: 26
<212> TYPE: PRT
<213> ORGANISM: Artificial Sequence
<220> FEATURE:
<223> OTHER INFORMATION: LEK-26
<220> FEATURE:
<221> NAME/KEY: MOD_RES
<222> LOCATION: (3)..(3)
<223> OTHER INFORMATION: ACETYLATION

<400> SEQUENCE: 30

Leu Glu Lys Gly Leu Asp Gly Ala Lys Lys Ala Val Gly Gly Leu Gly
1               5                   10                  15

Lys Leu Gly Lys Asp Ala Val Glu Asp Leu
            20                  25


<210> SEQ ID NO 31
<211> LENGTH: 24
<212> TYPE: PRT
<213> ORGANISM: Artificial Sequence
<220> FEATURE:
<223> OTHER INFORMATION: LEK-24
<220> FEATURE:
<221> NAME/KEY: MOD_RES
<222> LOCATION: (3)..(3)
<223> OTHER INFORMATION: ACETYLATION

<400> SEQUENCE: 31

Leu Glu Lys Gly Leu Asp Gly Ala Lys Lys Ala Val Gly Gly Leu Gly
1               5                   10                  15

Lys Leu Gly Lys Asp Ala Val Glu
            20


<210> SEQ ID NO 32
<211> LENGTH: 110
<212> TYPE: PRT
<213> ORGANISM: Artificial Sequence
<220> FEATURE:
<223> OTHER INFORMATION: Dermcidin
<220> FEATURE:
<221> NAME/KEY: MOD_RES
<222> LOCATION: (68)..(68)
```

-continued

```
<223> OTHER INFORMATION: ACETYLATION

<400> SEQUENCE: 32

Met Arg Phe Met Thr Leu Leu Phe Leu Thr Ala Leu Ala Gly Ala Leu
1               5                   10                  15

Val Cys Ala Tyr Asp Pro Glu Ala Ala Ser Ala Pro Gly Ser Gly Asn
            20                  25                  30

Pro Cys His Glu Ala Ser Ala Ala Gln Lys Glu Asn Ala Gly Glu Asp
        35                  40                  45

Pro Gly Leu Ala Arg Gln Ala Pro Lys Pro Arg Lys Gln Arg Ser Ser
    50                  55                  60

Leu Leu Glu Lys Gly Leu Asp Gly Ala Lys Lys Ala Val Gly Gly Leu
65                  70                  75                  80

Gly Lys Leu Gly Lys Asp Ala Val Glu Asp Leu Glu Ser Val Gly Lys
                85                  90                  95

Gly Ala Val His Asp Val Lys Asp Val Leu Asp Ser Val Leu
            100                 105                 110
```